(12) United States Patent
Shikagawa

(10) Patent No.: US 10,549,562 B2
(45) Date of Patent: Feb. 4, 2020

(54) PRINTING APPARATUS AND CONTROL METHOD OF PRINTING APPARATUS

(71) Applicant: SEIKO EPSON CORPORATION, Tokyo (JP)

(72) Inventor: Yuichi Shikagawa, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/988,318

(22) Filed: May 24, 2018

(65) Prior Publication Data

US 2018/0339535 A1  Nov. 29, 2018

(30) Foreign Application Priority Data

May 25, 2017 (JP) ................................. 2017-103375

(51) Int. Cl.
| | |
|---|---|
| *B41J 29/393* | (2006.01) |
| *B41J 25/00* | (2006.01) |
| *B41J 2/21* | (2006.01) |
| *G06F 3/12* | (2006.01) |

(52) U.S. Cl.
CPC ........... *B41J 29/393* (2013.01); *B41J 2/2146* (2013.01); *B41J 25/001* (2013.01); *G06F 3/1208* (2013.01)

(58) Field of Classification Search
CPC ........ B41J 29/393; B41J 29/38; B41J 2/2135; B41J 2/2146; B41J 25/001; H04N 1/6033; H04N 1/506; G06K 15/027; G06F 3/1208

USPC .................................................... 347/14, 19
See application file for complete search history.

(56) References Cited

U.S. PATENT DOCUMENTS

| | | |
|---|---|---|
| 2012/0050376 A1 | 3/2012 | Nagoshi et al. |
| 2012/0218336 A1 | 8/2012 | Okada et al. |
| 2013/0235115 A1 | 9/2013 | Nagoshi et al. |

FOREIGN PATENT DOCUMENTS

| | | |
|---|---|---|
| JP | 04-028552 A | 1/1992 |
| JP | 2008-182352 A | 8/2008 |
| JP | 2009-233967 A | 10/2009 |
| JP | 2012-051241 A | 3/2012 |
| JP | 2012-187912 A | 10/2012 |

*Primary Examiner* — Jannelle M Lebron
(74) *Attorney, Agent, or Firm* — Foley & Lardner LLP

(57) ABSTRACT

There is provided a printing apparatus including: an ink jet head that prints on a print medium; a camera that captures an image on the print medium; an LED light source that irradiates a capturing area of the camera with light at a predetermined angle with respect to a print surface of the print medium; a carriage that mounts the ink jet head, the camera, and the LED light source; and a processor that executes calculation based on captured-image-data-of-unprinted-area obtained by capturing an image on the print medium by the camera and captured-image-data-of-test-pattern obtained by capturing an image of a test pattern by the camera, the test pattern being printed on the print medium by the ink jet head, and that acquires corrected captured-image-data representing a captured image of the test pattern, the corrected captured-image-data in which an influence of light irradiation by the LED light source is adjusted.

14 Claims, 26 Drawing Sheets

FIG. 2
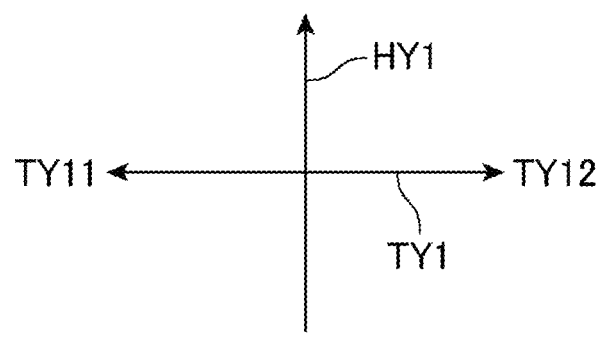
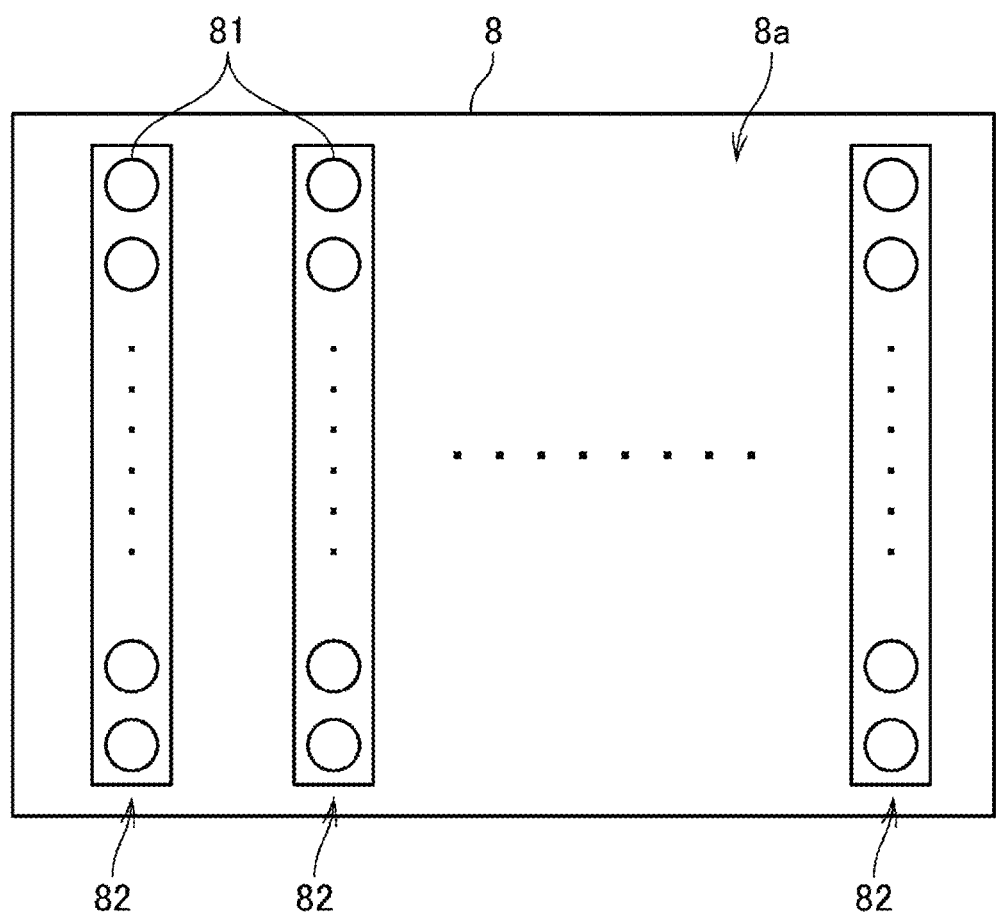

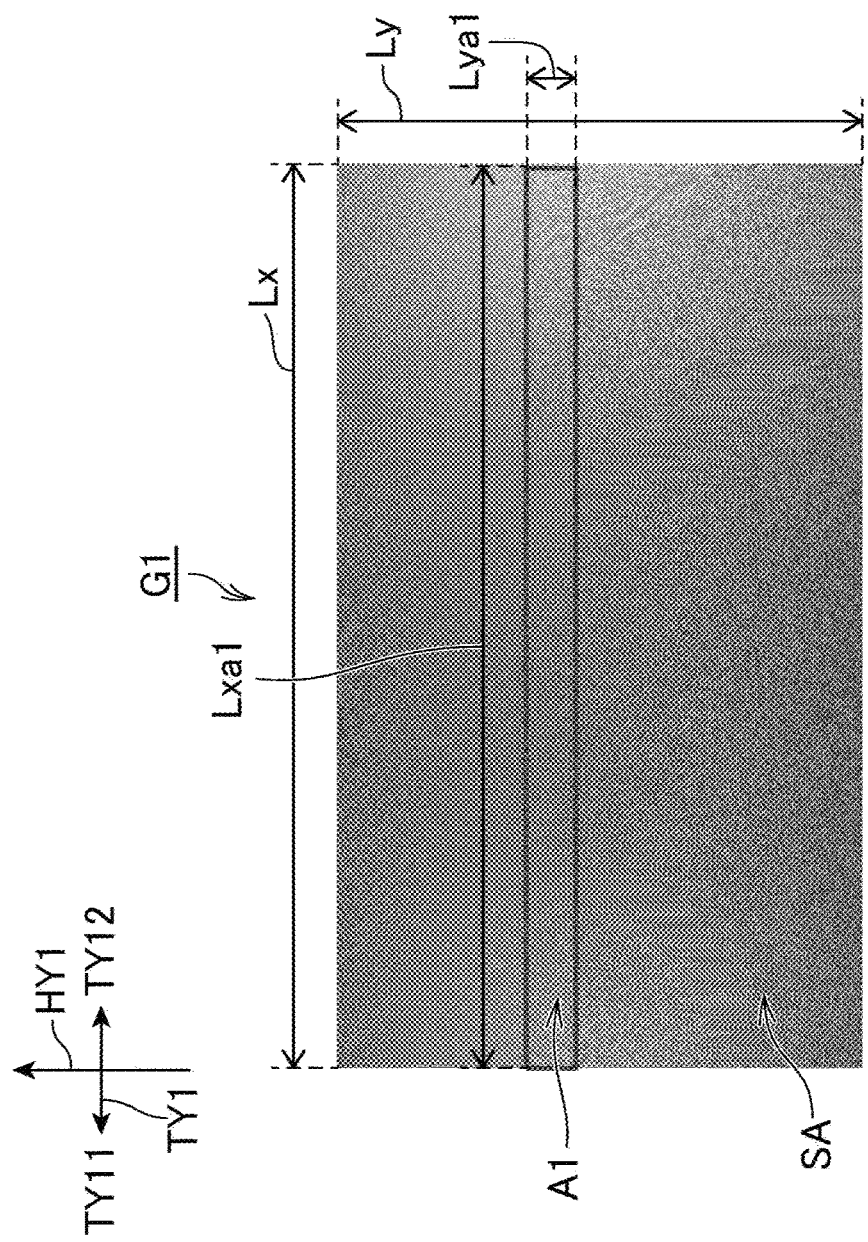

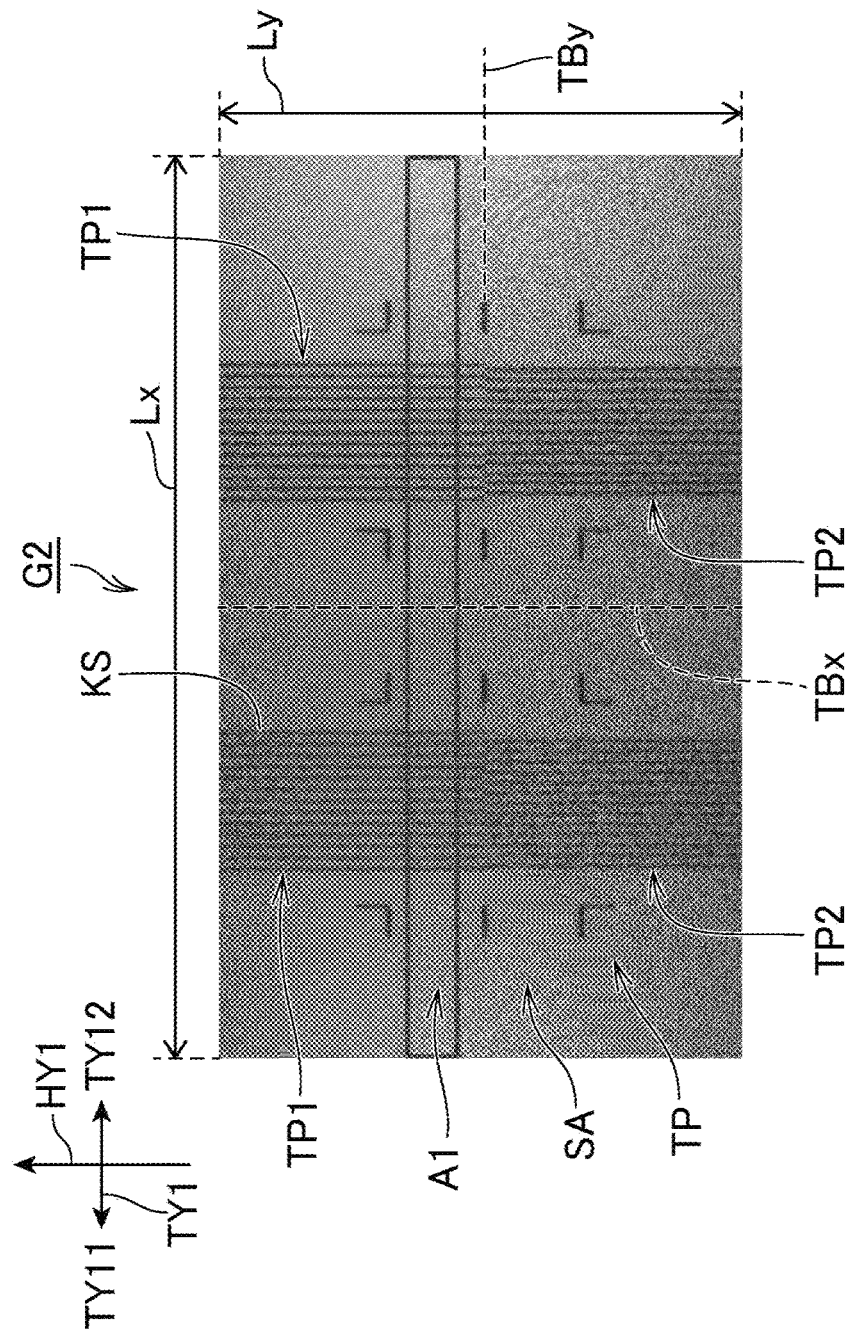

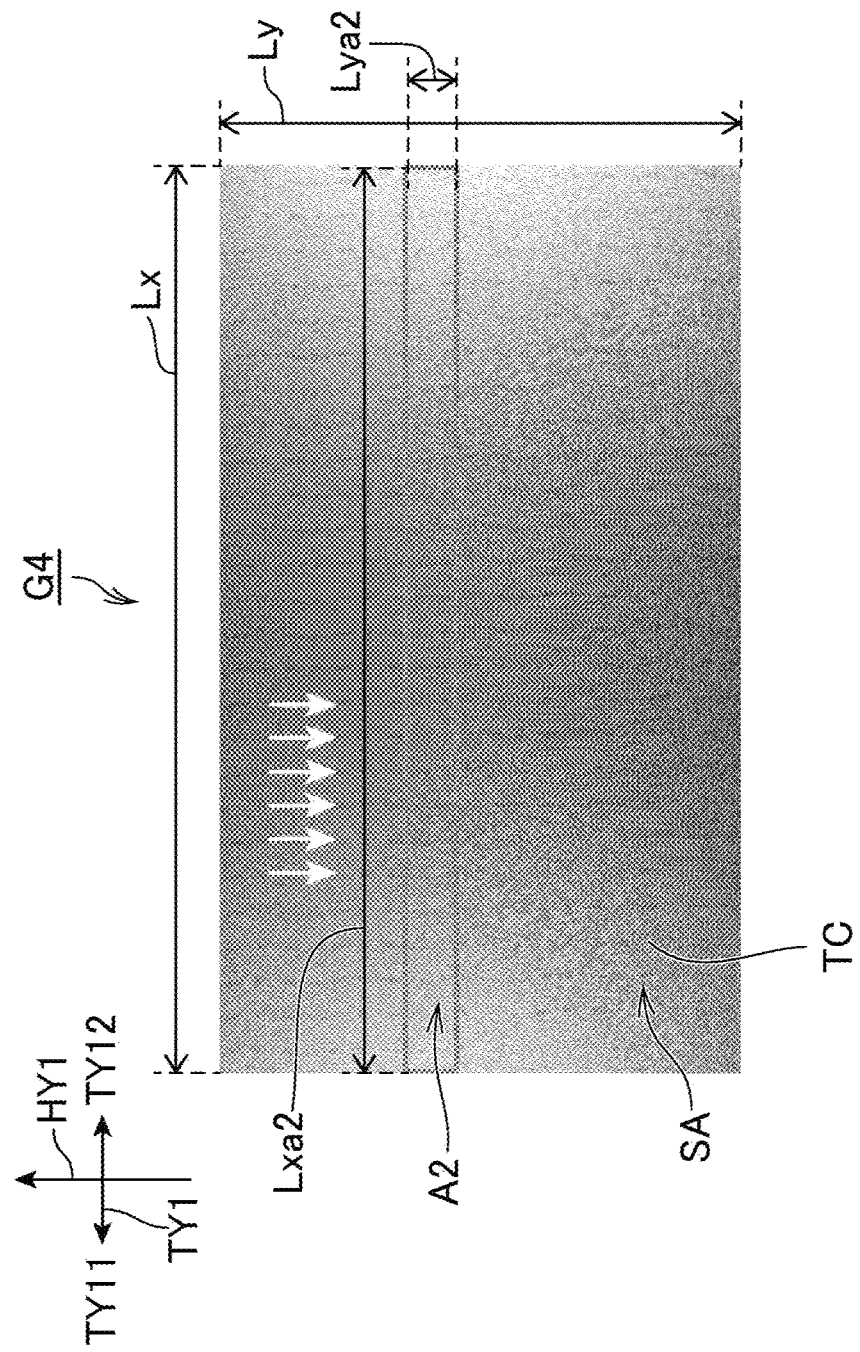

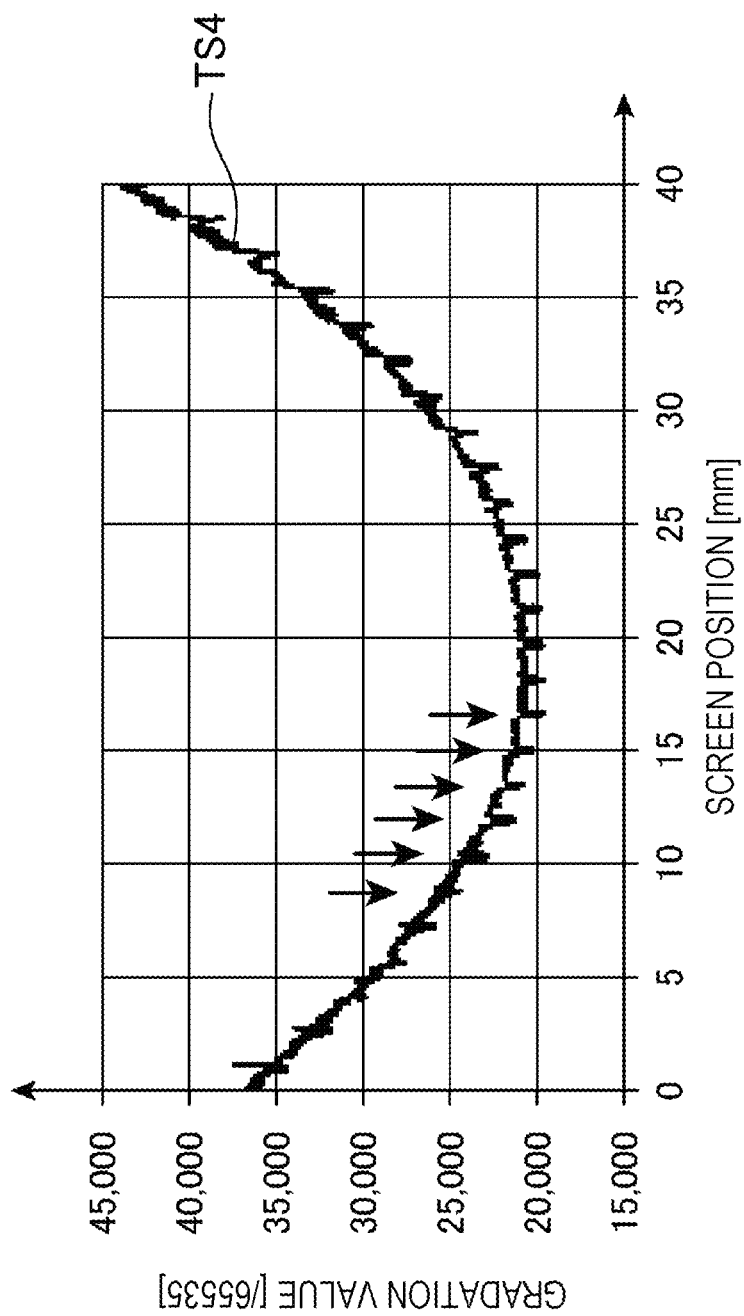

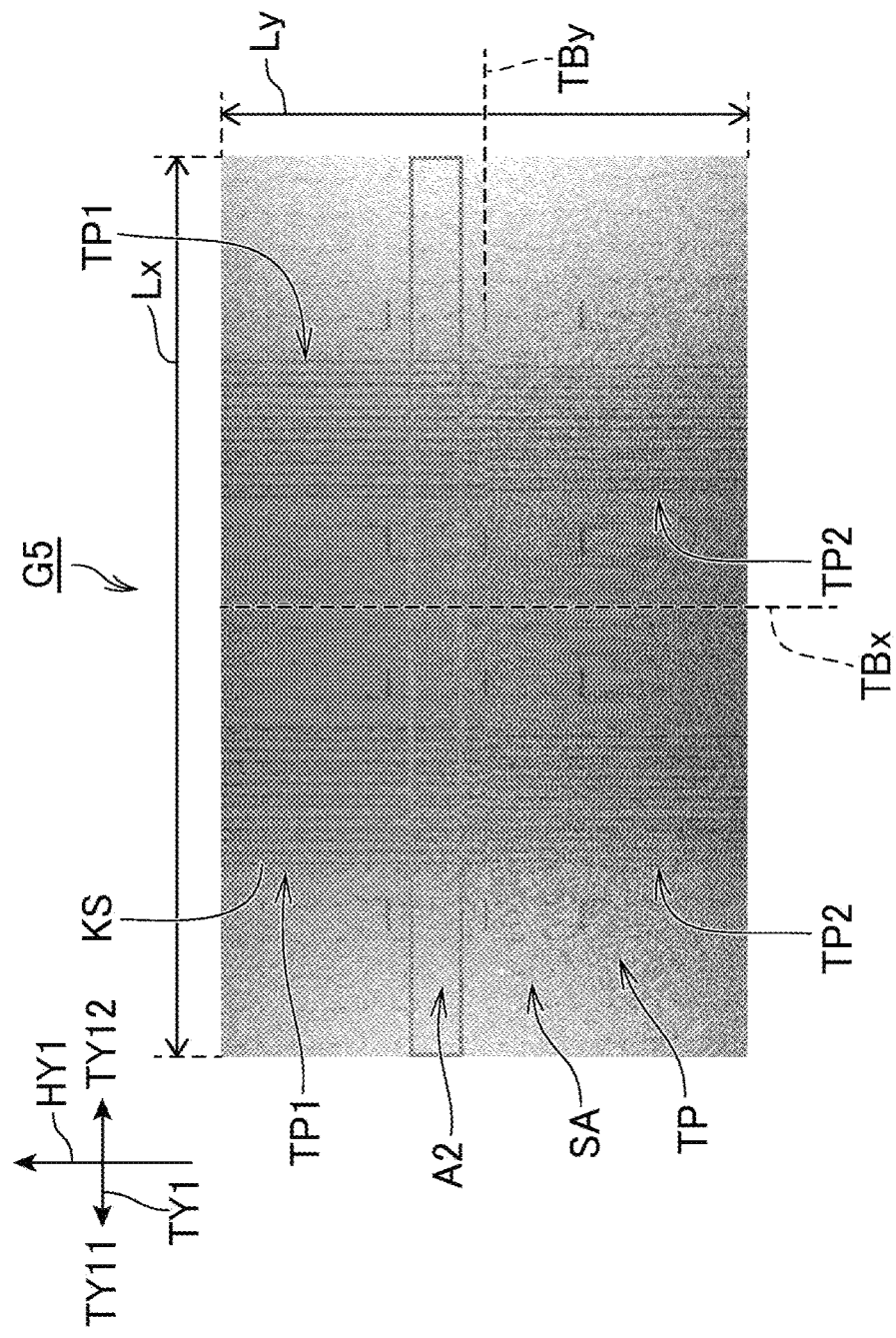

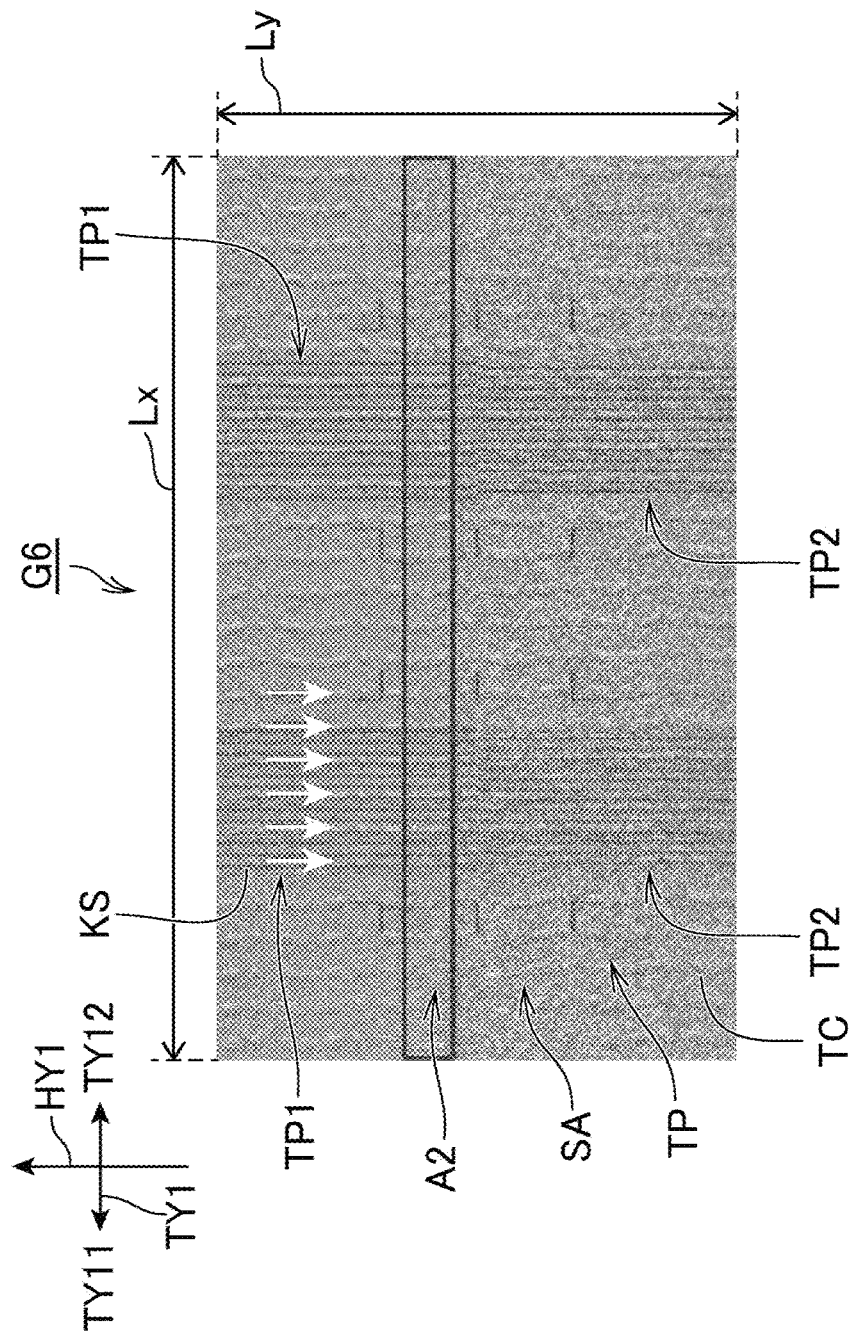

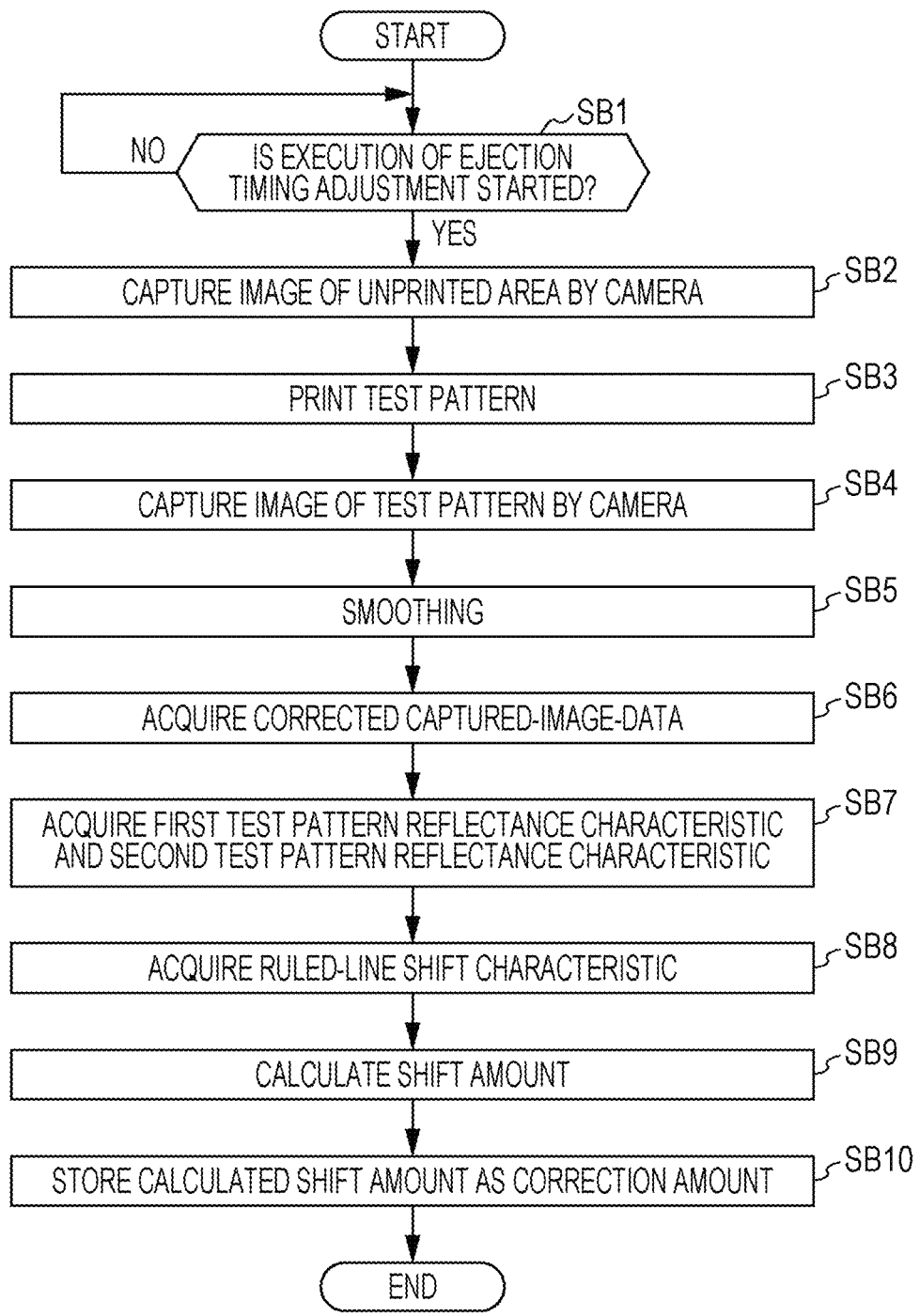

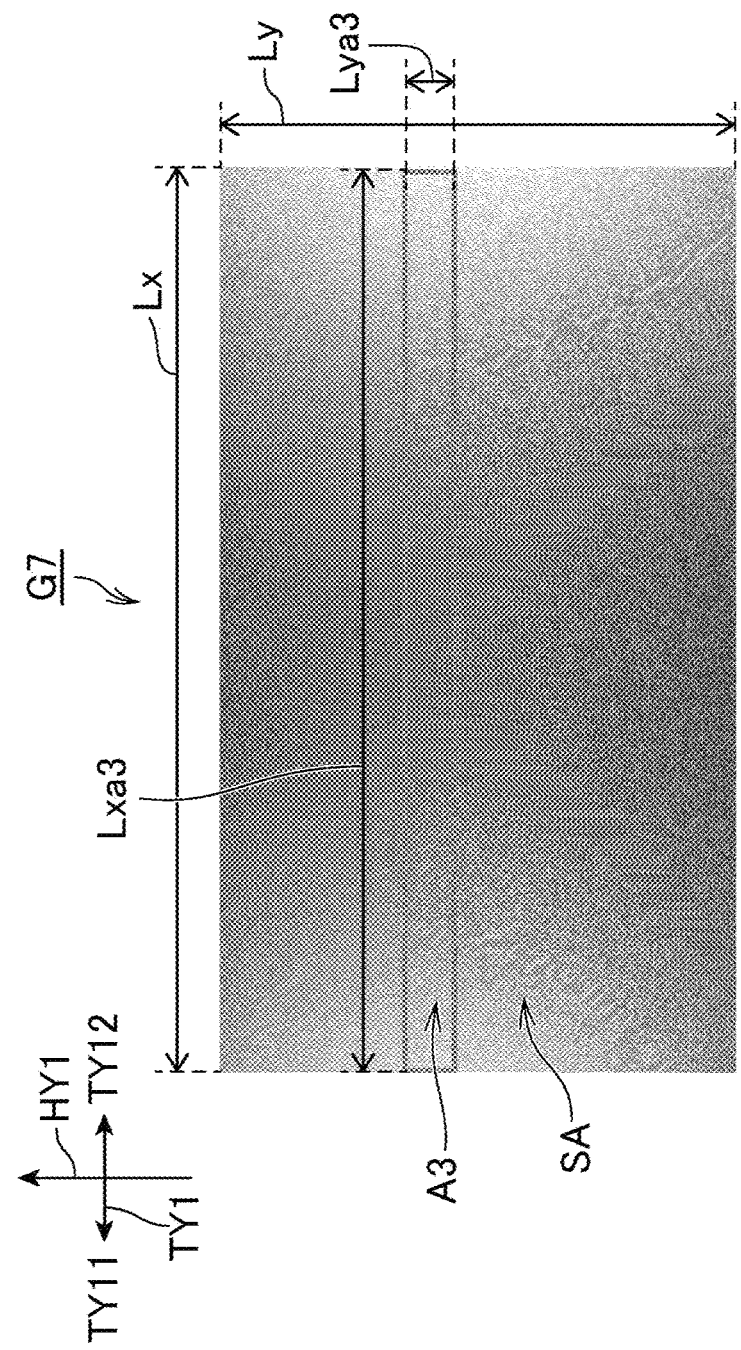

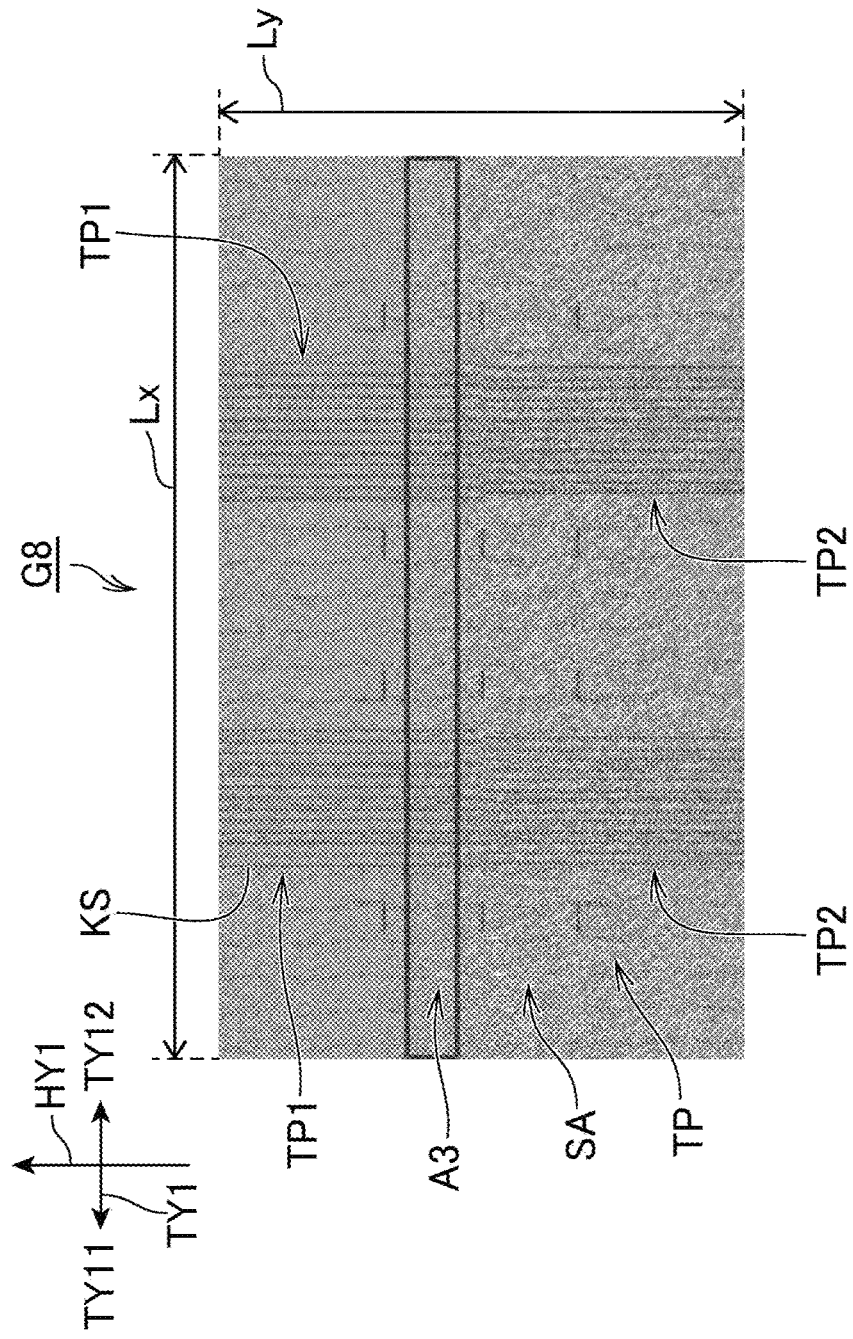

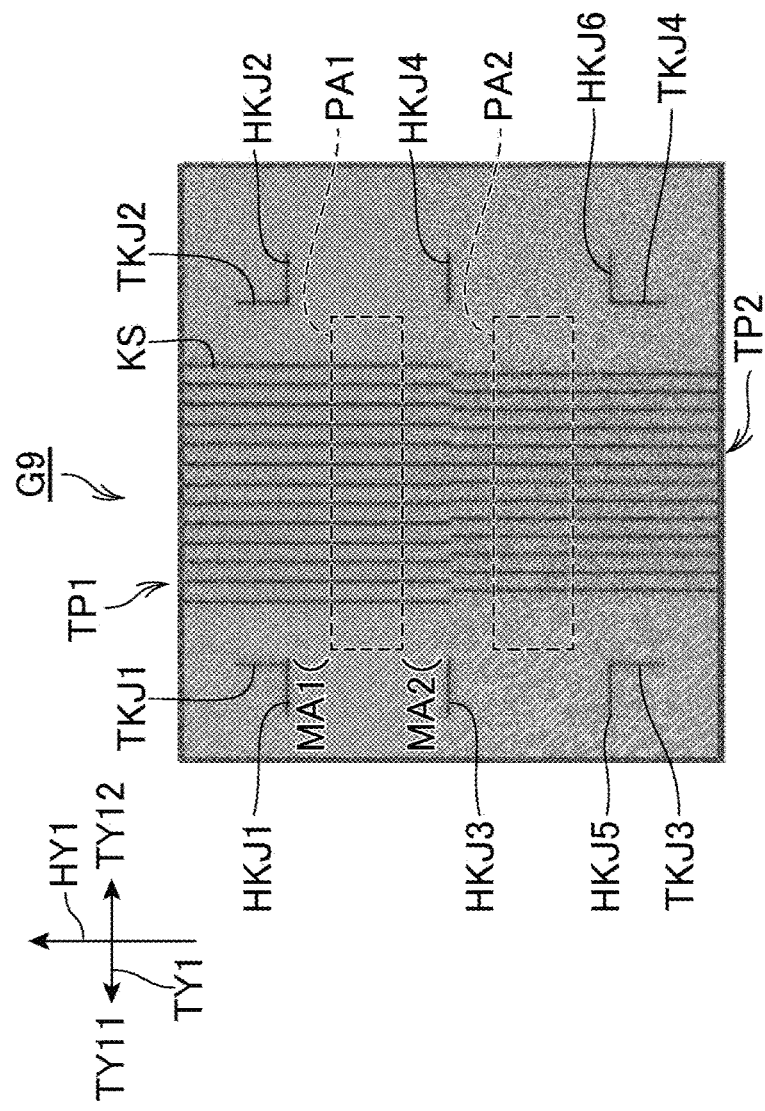

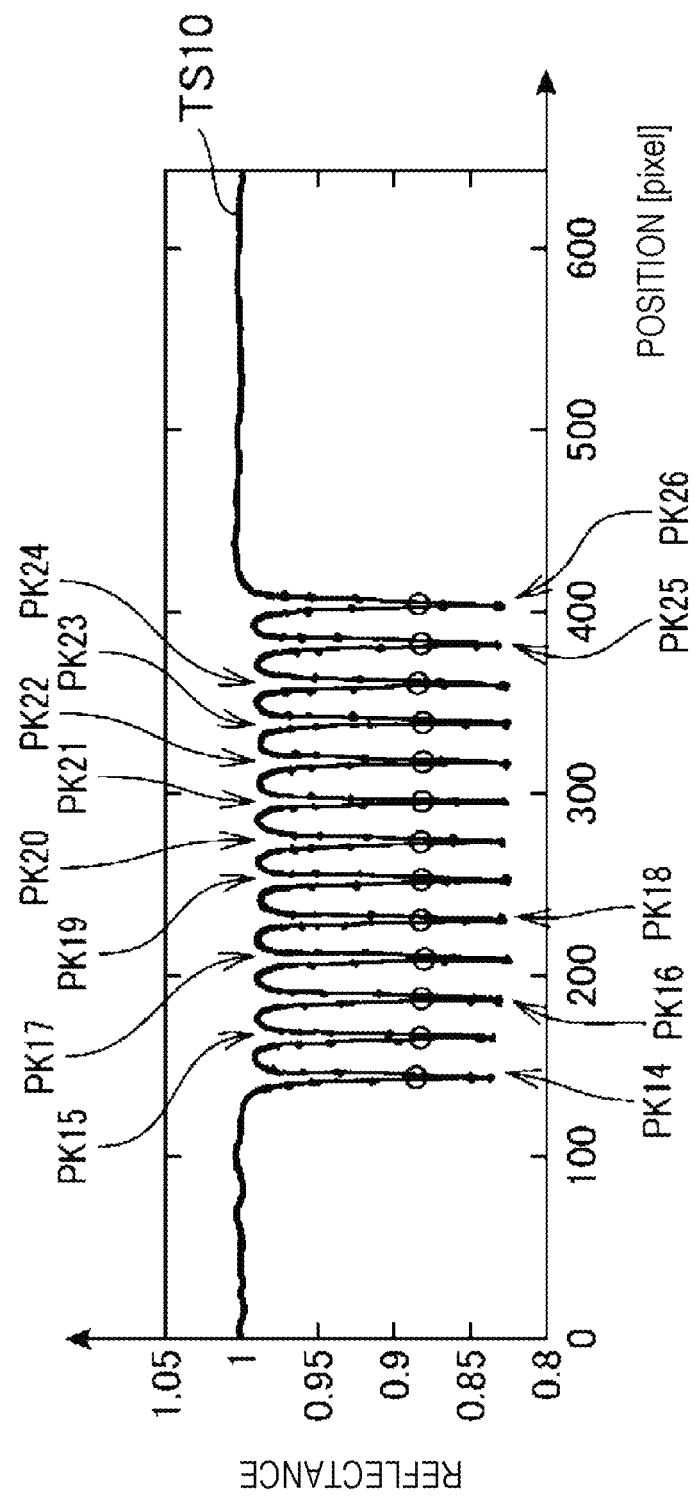

PRINTING APPARATUS AND CONTROL METHOD OF PRINTING APPARATUS

This application claims priority under 35 U.S.C. § 119 to Japanese Patent Application No. 2017-103375 filed on May 25, 2017, the entire disclosure of which is expressly incorporated by reference herein.

BACKGROUND

1. Technical Field

The present invention relates to a printing apparatus and a control method of the printing apparatus.

2. Related Art

In the related art, a technique of irradiating a print medium with light, capturing an image of a test pattern (measurement image) printed on the print medium, and acquiring captured image data of the captured test pattern is known (for example, refer to JP-A-2012-51241).

On the other hand, a printing apparatus may have a configuration in which a camera and a light source are mounted on a carriage together with a print head and a test pattern is acquired by the camera. In this type of printing apparatus, for reasons such as a restriction on disposition of the carriage, the light source may be disposed at a position at which a print surface of the print medium is irradiated with light at a predetermined angle. However, when the light source is disposed in this manner, an influence of light irradiation such as brightness unevenness is likely to occur in a capturing area of the camera, and as a result, the influence may be included in captured image data representing a captured image of the test pattern. For this reason, there is a concern that the printing apparatus cannot acquire accurate captured image data of the test pattern. JP-A-2012-51241 does not consider such a configuration of the printing apparatus and a fact that the influence such brightness unevenness may be included in the captured image data of the test pattern.

SUMMARY

An advantage of some aspects of the invention is to acquire accurate captured image data of the test pattern even in a configuration in which an influence by light irradiation is likely to occur.

According to an aspect of the invention, there is provided a printing apparatus including: a print head configured to print on a print medium; a camera configured to capture an image on the print medium; a light source configured to irradiate a capturing area of the camera with light at a predetermined angle with respect to a print surface of the print medium; a carriage configured to mount the print head, the camera, and the light source; and a processor configured to generate third captured image data which represents a captured image of a test pattern (a test image, a measurement image, an adjustment image) and in which brightness unevenness is adjusted, based on first captured image data obtained by capturing the image on the print medium by the camera and second captured image data obtained by capturing an image of the test pattern by the camera, the test pattern being printed on the print medium by the print head.

In this configuration, the processor executes calculation based on the first captured image data and the second captured image data, and generates the third captured image data of the test pattern, the third captured image data in which an influence of light irradiation by the light source is adjusted. Therefore, even in a configuration in which the influence of light irradiation such as brightness unevenness is likely to occur, it is possible to generate accurate captured image data of the test pattern.

In the printing apparatus, preferably, the print medium includes a texture (an irregularity or a pattern on a front surface of the print medium), and the processor configured to execute predetermined filter processing on the first captured image data and generate the third captured image data.

In this configuration, the processor executes predetermined filter processing on the first captured image data and generates the third captured image data, and thus, even in a case where the print medium includes a texture, it is possible to acquire accurate captured image data of the test pattern.

In the printing apparatus, preferably, the processor generates the third captured image data without executing the predetermined filter processing on the second captured image data.

In this configuration, the processor generates the third captured image data without executing the predetermined filter processing on the second captured image data, and thus the filter processing is not executed on the test pattern. Therefore, it is possible to acquire accurate captured image data of the test pattern.

In the printing apparatus, preferably, the predetermined filter processing is moving average filter processing or Gaussian filter processing.

In this configuration, the predetermined filter processing is moving average filter processing or Gaussian filter processing, and thus it is possible to acquire the first captured image data obtained by smoothing the texture of the print medium. Therefore, it is possible to acquire accurate captured image data of the test pattern.

In the printing apparatus, preferably, the print head configured to include a nozzle for ejecting an ink, the test pattern includes a first test pattern including ruled lines which are formed at predetermined intervals and a second test pattern including ruled lines which are formed by shifting the intervals of the ruled lines of the first test pattern by a predetermined amount, and the processor configured to calculate a shift amount for minimizing a shift between the ruled lines of the first test pattern and the ruled lines of the second test pattern based on a reflectance characteristic represented by the third captured image data of the first test pattern and a reflectance characteristic represented by the third captured image data of the second test pattern, and adjust a timing at which the ink is ejected from the nozzle by using the shift amount as a correction amount.

In this configuration, it is possible to calculate a shift amount with high accuracy based on a reflectance characteristic represented by the third captured image data of the first test pattern and a reflectance characteristic represented by the third captured image data of the second test pattern. Therefore, it is possible to adjust a timing at which the ink is ejected from the nozzle with high accuracy.

In the printing apparatus, preferably, the processor configured to cause the carriage to move in a first direction of a movement direction and cause the print head to print the first test pattern, and the processor configured to cause the carriage to move in a second direction of the movement direction that is opposite to the first direction and cause the print head to print the second test pattern.

In this configuration, the processor causes the carriage to move in a first direction and causes the print head to print the first test pattern, and the processor causes the carriage to move in a second direction and causes the print head to print the second test pattern. Therefore, it is possible to adjust an ink ejection timing in a movement direction of the carriage with high accuracy.

According to another aspect of the invention, there is provided a control method of a printing apparatus configured to include a carriage, the carriage mounting a print head which prints on a print medium, a camera which captures an image on the print medium, and a light source which irradiates a capturing area of the camera with light at a predetermined angle with respect to a print surface of the print medium, the method including: generating third captured image data which represents a captured image of a test pattern and in which brightness unevenness is adjusted, based on first captured image data obtained by capturing the image on the print medium by the camera and second captured image data obtained by capturing an image of the test pattern by the camera, the test pattern being printed on the print medium by the print head.

In this configuration, the processor executes calculation based on the first captured image data and the second captured image data, and generates the third captured image data of the test pattern, the third captured image data in which an influence of light irradiation by the light source is adjusted. Therefore, even in a configuration in which the influence of light irradiation such as brightness unevenness is likely to occur, it is possible to generate accurate captured image data of the test pattern.

BRIEF DESCRIPTION OF THE DRAWINGS

The invention will be described with reference to the accompanying drawings, wherein like numbers reference like elements.

FIG. 2 is a diagram for explaining an ink jet head.

FIG. 6A is a diagram illustrating an example of a captured image of an unprinted area.

FIG. 7A is a diagram illustrating an example of a captured image of a test pattern.

FIG. 9A is a diagram illustrating an example of a captured image of an unprinted area.

FIG. 9B is a graph illustrating an example of a characteristic of gradation values of the unprinted area.

FIG. 10A is a diagram illustrating an example of a captured image of a test pattern.

FIG. 11A is a diagram illustrating an example of a captured image represented by corrected captured-image-data.

FIG. 12 is a flowchart illustrating an operation of the printing apparatus.

FIG. 13A is a diagram illustrating an example of a captured image on which smoothing is performed.

FIG. 14A is a diagram illustrating an example of a captured image represented by corrected captured-image-data.

FIG. 15A is a diagram for explaining a first acquisition area and a second acquisition area.

FIG. 15C is a graph illustrating an example of a second test pattern reflectance characteristic.

DESCRIPTION OF EXEMPLARY EMBODIMENTS

Figure 1:
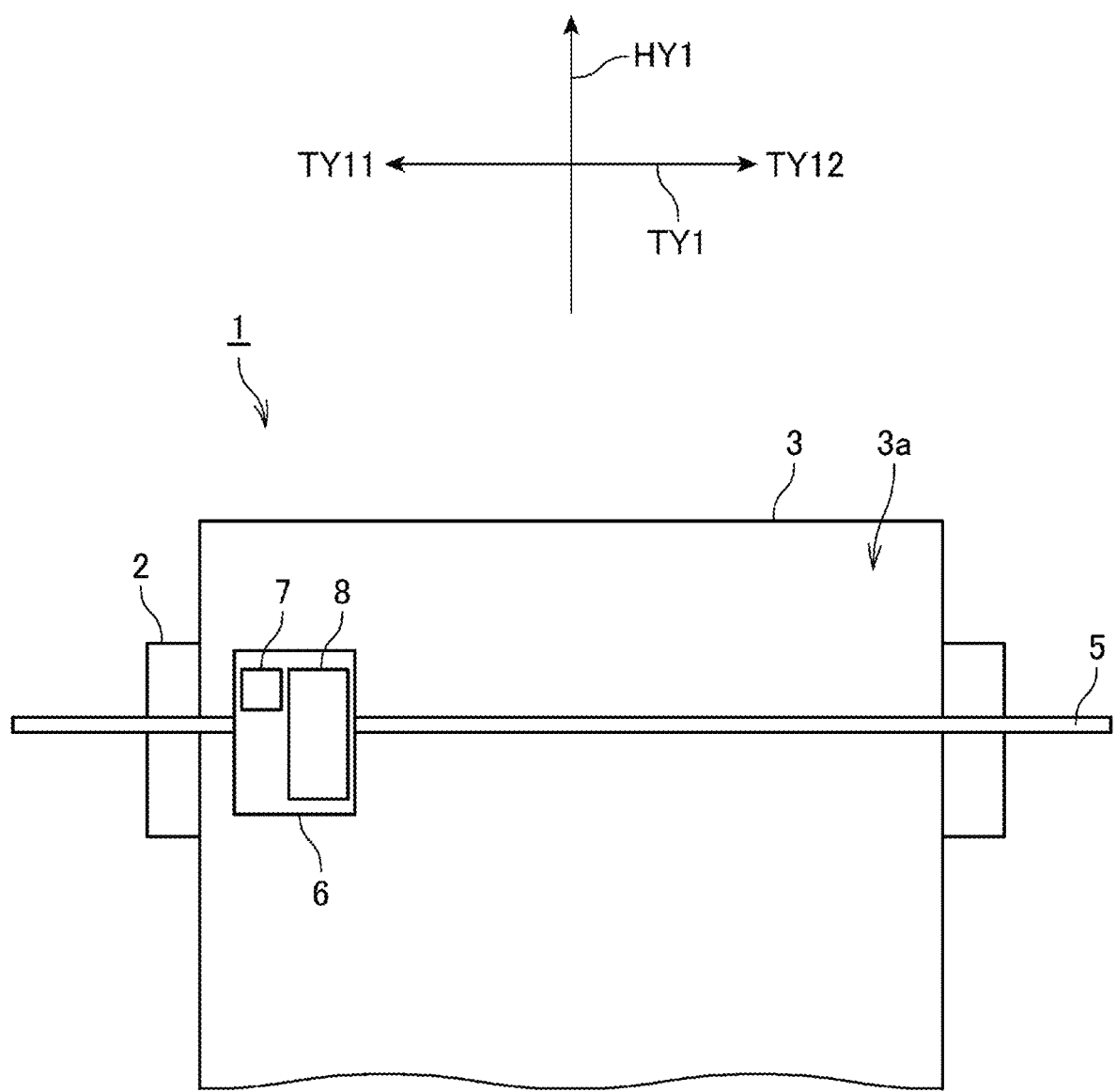
FIG. 1 is a schematic diagram illustrating a printing apparatus.

FIG. 1 is a schematic diagram illustrating a printing apparatus 1.

The printing apparatus 1 is an apparatus into which a print medium 3 is loaded and which has a function of executing printing on the loaded print medium 3 based on print data received from an external apparatus such as a host computer or print data stored in the printing apparatus 1.

Figure 4:
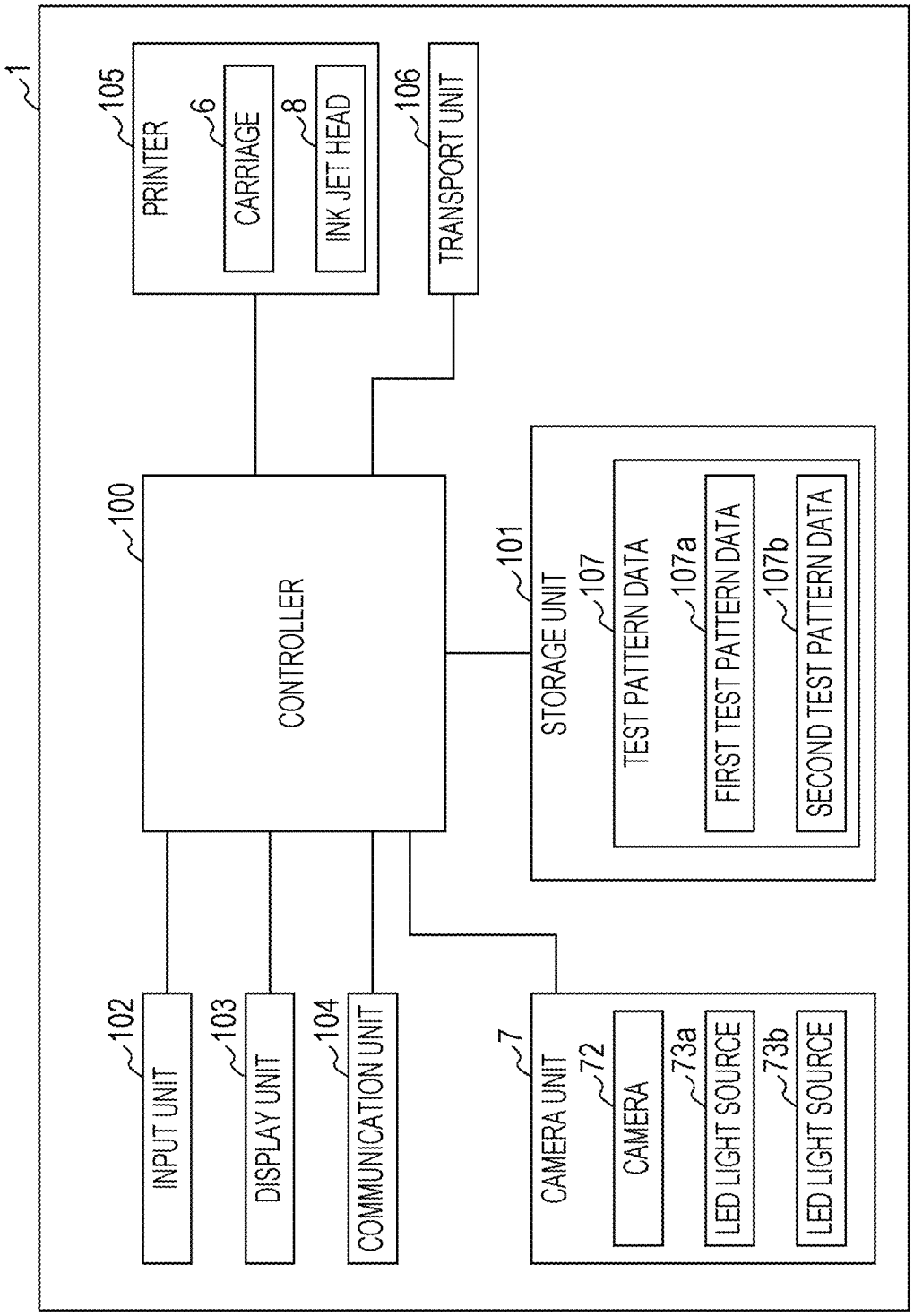
FIG. 4 is a diagram illustrating a functional configuration of the printing apparatus.

As illustrated in FIG. 1, the printing apparatus 1 includes a platen 2. A predetermined print medium 3 is transported on an upper surface of the platen 2 in a transport direction HY1 by a transport mechanism (transport unit) 106 (FIG. 4).

The print medium 3 is not limited to a paper medium, and means a medium such as a film or a fiber which can be loaded into the printing apparatus 1 and on which printing can be performed by the printing apparatus 1. The printing apparatus 1 according to the present embodiment is an ink jet printer that prints characters, images, and the like by forming dots by ejecting an ink onto the loaded print medium 3 using an ink jet head 8 (print head). In particular, the printing apparatus 1 according to the present embodiment is a so-called large format printer (LFP), and a large medium as the print medium 3 can be loaded into the printing apparatus 1. As an example of the print medium 3, in a case of cut paper, an "A0" size paper sheet can be loaded into the printing apparatus 1, and in a case of roll paper, a paper sheet having a width more than "900 mm" can be loaded into the printing apparatus 1.

A guide shaft 5 is provided above the platen 2, the guide shaft 5 extending in a perpendicular direction TY1 (a movement direction) perpendicular to the transport direction HY1 of the print medium 3. A carriage 6 is provided on the guide shaft 5 so as to reciprocate along the guide shaft 5 by a drive mechanism. That is, the carriage 6 reciprocates along the guide shaft 5 in the perpendicular direction TY1. Therefore, the perpendicular direction TY1 corresponds to a movement direction of the carriage 6, and corresponds to a movement direction of the carriage 6.

A camera module (camera unit) 7 and an ink jet head 8 are mounted on the carriage 6 by being disposed side by side in the perpendicular direction TY1. In FIG. 1, the camera module 7 is disposed on the carriage 6 closer to a direction TY11 (a first direction, one movement direction of the carriage 6) than the ink jet head 8 is. In addition, the ink jet head 8 is disposed on the carriage 6 closer to a direction TY12 (a second direction, the other movement direction of the carriage 6) than the camera module 7 is. The camera module 7 will be described later.

FIG. 2 is a diagram for explaining the ink jet head 8.

The ink jet head 8 includes a plurality of nozzle lines 82 formed by disposing a plurality of nozzles 81 which ejects an ink side by side in the transport direction HY1 on an ink ejection surface 8a facing a print surface 3a of the print medium 3. As illustrated in FIG. 2, the ink jet head 8 includes the plurality of nozzle lines 82 disposed side by side in the perpendicular direction TY1. The nozzles 81 included in the nozzle line 82 are disposed at regular intervals along the transport direction HY1. The ink jet head 8 includes the nozzle lines 82 for each color ink to be ejected onto the print medium 3. For example, in a case where colors of inks to be ejected are ten colors of cyan, magenta, yellow, light cyan, light magenta, gray, light gray, matte black, and photo black, the ink jet head 8 includes ten nozzle lines 82.

Returning to the explanation of FIG. 1, in the present embodiment, it is assumed that the direction TY12 in the printing apparatus 1 is a side on which a maintenance mechanism that performs maintenance such as cleaning of sucking an ink from an opening of the nozzle 81 is disposed (hereinafter, referred to as a "home position side"). On the other hand, in the present embodiment, it is assumed that the direction TY11 in the printing apparatus 1 is a side opposite to the home position side (hereinafter, referred to as "full side").

In a case where the maintenance mechanism is positioned in the direction TY11, where the direction TY11 is the home position side, and where the direction TY12 is the full side, the camera module 7 is disposed on the carriage 6 closer to the direction TY12 than the ink jet head 8 is.

In this manner, the camera module 7 is disposed on the carriage 6 closer to a side that is not the home position side than the ink jet head 8 is. Thereby, the camera module 7 does not interfere with the maintenance unit, and thus it is possible to prevent mist of the ink from adhering to the camera module 7. Therefore, it is possible to prevent a degradation in function of the camera module 7.

Next, the camera module 7 will be described.

Figure 3:
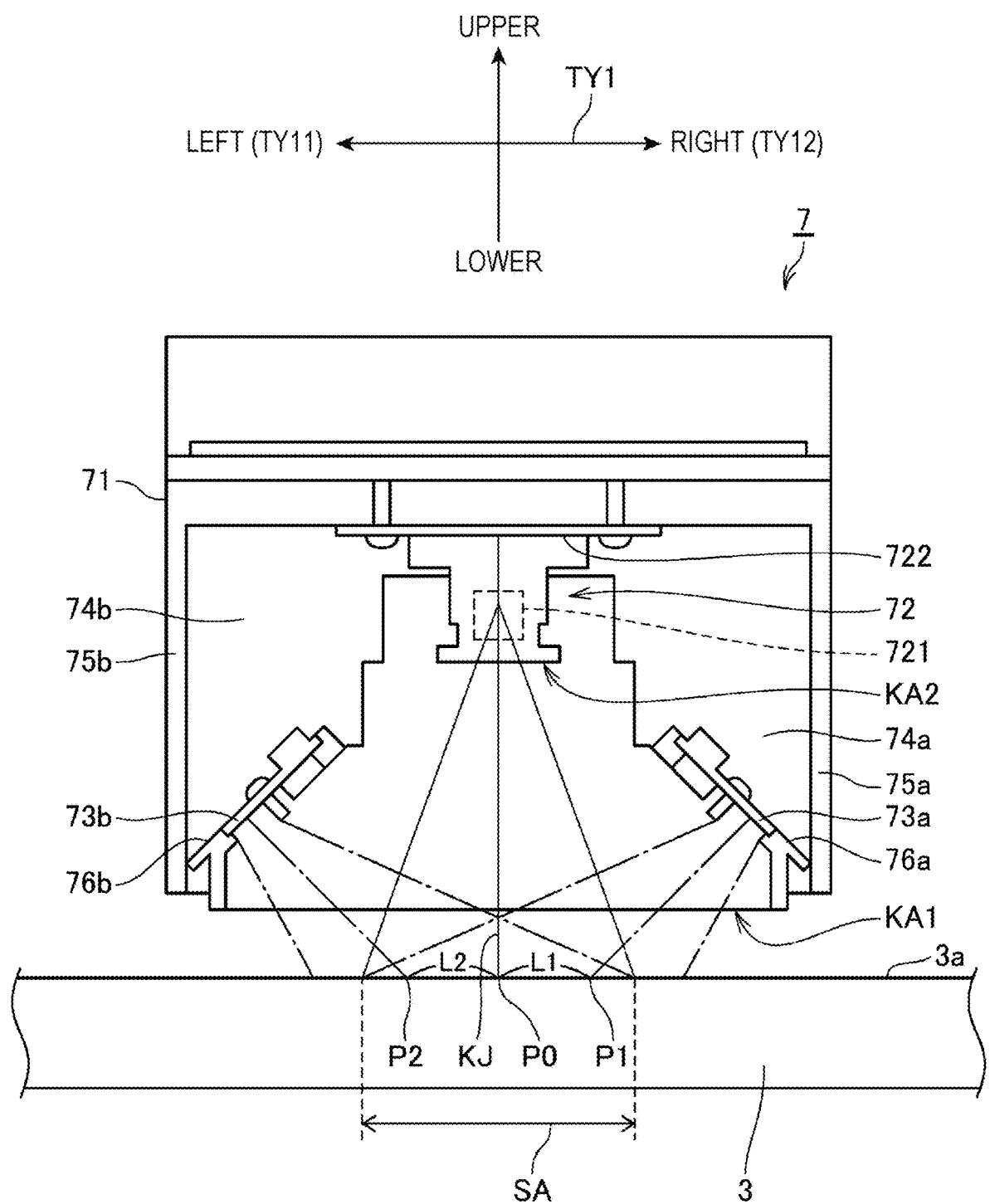
FIG. 3 is a diagram illustrating a configuration of a main portion of a camera module.

FIG. 3 is a diagram illustrating a configuration of a main portion of the camera module 7.

In an explanation of FIG. 3, as represented by arrows, it is assumed that a direction toward the left in FIG. 3 is a "left side". In addition, it is assumed that a direction toward the right in FIG. 3 is a "right side". In addition, it is assumed that a direction toward the upper in FIG. 3 is an "upper side". In addition, it is assumed that a direction toward the lower in FIG. 3 is a "lower side". The left side corresponds to the direction TY11 of the perpendicular direction TY1, and the right side corresponds to the direction TY12 of the perpendicular direction TY1.

As illustrated in FIG. 3, the camera module 7 is configured to include a housing 71, a camera 72, an LED light source 73a (light source), and an LED light source 73b (light source).

The housing 71 accommodates the camera 72, the LED light source 73a, and the LED light source 73b. The housing 71 is made of a material such as aluminum having a light weight and high thermal conductivity, and an opening KA1 is formed on a lower surface of the housing 71.

The camera 72 is disposed on an upper side of the inside of the housing 71. The camera 72 includes a lens (lens unit) 721 and a sensor 722. In addition, an opening KA2 is formed on a lower end of the camera 72. The sensor 722 is configured with an RGB image sensor including a plurality of pixels, and receives light via the opening KA1, the opening KA2, and the lens 721, the light with which a capturing area SA on the print surface 3a of the print medium 3 is irradiated and which is reflected from the capturing area SA. The sensor 722 outputs an electrical signal corresponding to an amount of the reflected light that is received by each pixel. In addition, the sensor 722 captures an image of the capturing area SA on the print surface 3a of the print medium 3. In the present embodiment, the capturing area SA is a rectangular area in which a length in the transport direction HY1 is longer than a length in the perpendicular direction TY1. The sensor 722 is disposed such that an optical axis KJ of the reflected light to be received passes through the center point of the opening KA2 and the center point of the opening KA1.

The lens 721 forms an image on the sensor 722 by the reflected light, which is reflected from the capturing area SA on the print surface 3a of the print medium 3, and is configured with, for example, a combination of a plurality of lenses. The lens 721 is disposed such that an optical axis of the lens 721 matches the optical axis KJ.

The camera module 7 includes a light source fixing member 74a which is disposed on the right side inside the housing 71 and a light source fixing member 74b which is disposed on the left side inside the housing 71. A right end of the light source fixing member 74a is fixed to a right wall portion 75a of the housing 71, and an inclined portion 76a inclined with respect to the optical axis KJ is formed on a left end of the light source fixing member 74a. On the other hand, a left end of the light source fixing member 74b is fixed to a left wall portion 75b of the housing 71, and an inclined portion 76b inclined with respect to the optical axis KJ is formed on a right end of the light source fixing member 74b.

The LED light source 73a is disposed on the inclined portion 76a of the light source fixing member 74a. As illustrated in FIG. 3, the inclined portion 76a of the light source fixing member 74a is inclined such that an optical axis of light emitted from the LED light source 73a is positioned at a position P1 away from an intersection point P0 between the optical axis KJ and the print medium 3 to the right side by a predetermined distance L1. On the other hand, the LED light source 73b is disposed on the inclined portion 76b of the light source fixing member 74b. As illustrated in FIG. 3, the inclined portion 76b of the light source fixing member 74b is inclined such that an optical axis of light emitted from the LED light source 73b is positioned at a position P2 away from the intersection point P0 to the left side by a predetermined distance L2. An inclination of the light source fixing member 74a and an inclination of the light source fixing member 74b may be fixed, or may be changed by a predetermined mechanism. In this manner, the light source fixing member 74a and the light source fixing member 74b are inclined, and thus the LED light source 73a and the LED light source 73b irradiate the print surface 3a of the print medium 3 with light at a predetermined angle (for example, 45°).

As described above, the LED light source 73a irradiates the print surface 3a with light at a predetermined angle toward the position P1 positioned rightward from the intersection point P0 by the predetermined distance L1. Therefore, around the position P1, the print surface 3a of the print medium 3 is irradiated with light of which a light intensity decreases as a distance from the position P1 increases. On the other hand, the LED light source 73b irradiates the print surface 3a with light at a predetermined angle toward the position P2 positioned leftward from the intersection point P0 by the predetermined distance L2. Therefore, around the position P2, the print surface 3a of the print medium 3 is irradiated with light of which a light intensity decreases as a distance from the position P2 increases. Accordingly, the predetermined distance L1 and the predetermined distance L2 are appropriately set such that the capturing area SA is irradiated with light having a uniform light intensity. As the position P1 and the position P2 are positioned closer to the intersection point P0, in both sides of the capturing area SA in the perpendicular direction TY1, the irradiation light intensity is decreased, and as a result, brightness unevenness occurs. On the other hand, as the position P1 and the position P2 are away from the intersection point P0, in both sides of the capturing area SA in the perpendicular direction TY1, the irradiation light intensity is decreased, and as a result, brightness unevenness occurs. Therefore, the predetermined distance L1 and the predetermined distance L2 are appropriately set.

Next, a functional configuration of the printing apparatus 1 will be described.

FIG. 4 is a diagram illustrating a functional configuration of the printing apparatus 1.

As illustrated in FIG. 4, the printing apparatus 1 includes a controller 100, a storage (storage unit) 101, an input device (input circuit, input unit or input board) 102, a display (display unit) 103, a communicator (a communication unit, a transmitter and receiver, a communication circuit, or a communication board) 104, the camera module (camera unit) 7, a printer 105, and a transport mechanism (transport unit) 106.

The controller 100 includes a CPU (processor), a ROM (memory), a RAM, an ASIC, a signal processing circuit, and the like, and controls each component of the printing apparatus 1. In the controller 100, the CPU executes processing by, for example, reading a program such as firmware stored in the ROM or the storage 101 to be described, executes processing by, for example, a function implemented in the ASIC (logic circuit), and executes processing by, for example, cooperation of hardware and software such as signal processing by a signal processing circuit.

The storage 101 includes a nonvolatile memory such as a hard disk or an EEPROM, and stores various data so as to be rewritable. In addition, the storage 101 stores test pattern data 107 representing a test pattern TP (FIG. 7A and the like). The test pattern data 107 includes first test pattern data 107a for printing a first test pattern TP1 (test pattern) (FIG. 7A and the like) on the print medium 3, and second test pattern data 107b for printing a second test pattern TP2 (test pattern) (FIG. 7A and the like) on the print medium 3. The first test pattern TP1 and the second test pattern TP2 will be described later.

The input device 102 includes an input device such as an operation panel or a touch panel provided in the printing apparatus 1, detects a user's operation on the input device, and outputs the detected operation to the controller 100. The controller 100 executes processing corresponding to the operation on the input device based on the input from the input device 102.

The display 103 includes a plurality of LEDs, a display panel, and the like, and turns on/off the LEDs in a predetermined manner or displays information on the display panel under a control of the controller 100.

Under the control of the controller 100, the communicator 104 performs a communication with an external apparatus such as a host computer according to a predetermined communication standard.

The camera module 7 includes the camera 72, the LED light source 73a, and the LED light source 73b. As described above, the camera 72 includes the lens 721 and the sensor 722, captures an image of the capturing area SA on the print surface 3a of the print medium 3, and outputs captured image data of the captured image to the controller 100. Under the control of the controller 100, electric power is supplied to the LED light source 73a and the LED light source 73b, and thus the LED light source 73a and the LED light source 73b irradiate the print surface 3a of the print medium 3 with light.

The printer 105 includes the ink jet head 8 that forms dots by ejecting an ink onto the print medium 3 loaded into the printing apparatus 1, the carriage 6 that moves the ink jet head 8 in the perpendicular direction TY1, a carriage drive motor that drives the carriage 6, a heater that dries the print medium 3 onto which the ink is adhered, and other configurations related to the printing on the print medium 3. The controller 100 performs a control such that the printer 105 forms dots by ejecting the ink onto the print medium 3 loaded into the printing apparatus 1. Thereby, characters, images, and the like are printed.

The transport mechanism 106 includes a transport roller for transporting the print medium 3 in the transport direction HY1, a transport motor for rotating the transport roller, a motor driver for driving the transport motor, and other configurations related to the transporting of the print medium 3. The transport mechanism 106 transports the print medium 3 under the control of the controller 100.

On the other hand, the first test pattern TP1 (FIG. 7A and the like) according to the present embodiment that is represented by the first test pattern data 107a is a pattern image which includes a plurality of ruled lines KS (FIG. 7A and the like) extending along the transport direction HY1 at predetermined intervals. In addition, as will be described later, the second test pattern TP2 (FIG. 7A and the like) that is represented by the second test pattern data 107b is a pattern image that includes a plurality of ruled lines KS which are shifted by a predetermined amount with respect to the ruled lines KS of the first test pattern TP1 (FIG. 7A and the like). As will be described later, the printing apparatus 1 according to the present embodiment adjusts a timing of ejecting the ink from the nozzles 81 based on the first test pattern TP1 (FIG. 7A and the like) and the second test pattern TP2 (FIG. 7A and the like). In the following description, adjustment of a timing of ejecting the ink from the nozzles 81 is referred to as ejection timing adjustment. In the present embodiment, the ejection timing adjustment includes processing of calculating a correction amount for correcting an ink ejection timing.

In this manner, in order to execute the ejection timing adjustment based on the first test pattern TP1 (FIG. 7A and the like) and the second test pattern TP2 (FIG. 7A and the like), the printing apparatus 1 prints the first test pattern TP1 (FIG. 7A and the like) and the second test pattern TP2 (FIG. 7A and the like) on the print medium 3. The printing apparatus 1 causes the camera 72 to capture images of the printed first test pattern TP1 (FIG. 7A and the like) and the printed second test pattern TP2 (FIG. 7A and the like), generates (acquires) captured image data representing a captured image obtained by capturing the first test pattern TP1 (FIG. 7A and the like) and captured image data representing a captured image obtained by capturing the second test pattern TP2 (FIG. 7A and the like), and executes the ejection timing adjustment.

On the other hand, as described above, the camera module 7 includes the LED light source 73a and the LED light source 73b, and irradiates the print surface 3a of the print medium 3 with light at a predetermined angle. As a result, in the capturing area SA, an irradiation amount of light and a reflection amount of light tend to increase in the vicinity of the LED light source 73a and the LED light source 73b. Thus, in the capturing area SA which is captured by the camera 72, brightness unevenness (influence by light irradiation) is likely to occur. When brightness unevenness occurs, the captured image data becomes captured image data including the brightness unevenness. For this reason, the printing apparatus 1 according to the present embodiment may acquire captured image data representing a captured image of the first test pattern TP1 (FIG. 7A and the like) that includes the brightness unevenness and captured image data representing a captured image of the second test pattern TP2 (FIG. 7A and the like) that includes the brightness unevenness. As a result, there is a possibility that ejection timing adjustment cannot be performed with high accuracy.

Therefore, when generating (acquiring) the captured image data (hereinafter, referred to as "corrected captured-image-data") (third captured image data) of the test pattern TP (FIG. 7A and the like) to be used for the ejection timing adjustment, the printing apparatus 1 according to the present embodiment executes the following operations.

Figure 5:
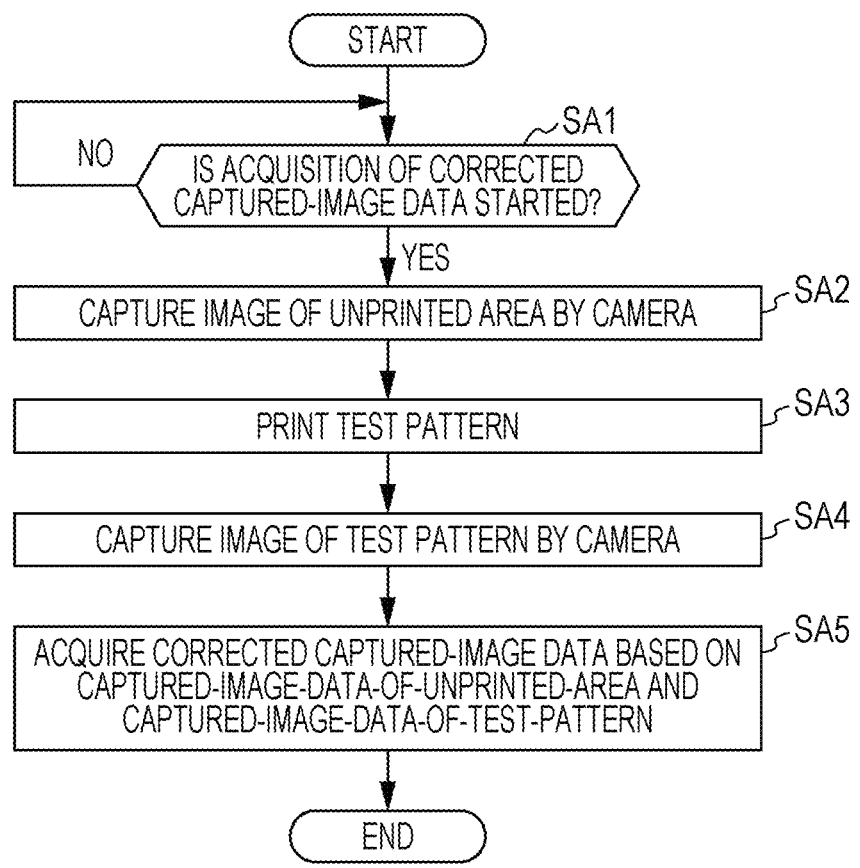
FIG. 5 is a flowchart illustrating an operation of the printing apparatus according to the present embodiment.

FIG. 5 is a flowchart illustrating an operation of the printing apparatus 1 according to the present embodiment.

In an explanation of FIG. 5, it is assumed that the print medium 3 does not include textures TC (FIG. 9A and the like). The texture TC represents at least an irregularity or a pattern on the print surface 3a of the print medium 3.

In addition, in the explanation of FIG. 5, it is assumed that the print medium 3 is a white print medium 3. That is, a color of an area of the print medium 3 at which printing is not executed (hereinafter, referred to as "unprinted area") is white.

As illustrated in FIG. 5, the controller 100 of the printing apparatus 1 determines whether to start generation (acquisition) of corrected captured-image-data (step SA1). For example, in a case where the input device 102 detects an operation instructing an execution of ejection timing adjustment, the controller 100 determines to start an acquisition of corrected captured-image-data based on the input from the input device 102 (YES in step SA1). In addition, for example, in a case where a predetermined time period elapses after the previous execution of ejection timing adjustment, the controller 100 determines to start an acquisition of corrected captured-image-data in response to the elapse of the predetermined time period (YES in step SA1). In addition, for example, in a case where power is initially supplied to the printing apparatus 1, the controller 100 determines to start an acquisition of corrected captured-image-data in response to the power supply (YES in step SA1).

When the controller determines to start an acquisition of corrected captured-image-data (YES in step SA1), the controller 100 causes the camera 72 to capture an image of an unprinted area (step SA2). When the camera 72 captures an image, the controller 100 causes the LED light source 73a and the LED light source 73b to irradiate the print surface 3a of the print medium 3 with light by supplying power to the LED light source 73a and the LED light source 73b.

FIG. 6A is a diagram illustrating an example of a captured image G1 of the unprinted area.

The captured image G1 illustrated in FIG. 6A is a captured image corresponding to the capturing area SA of the camera 72. As illustrated in FIG. 6A, the captured image G1 is a rectangular-shaped captured image, a length of the captured image G1 in the perpendicular direction TY1 (a direction corresponding to a movement direction of the carriage 6) has a dimension Lx, and a length of the captured image G1 in the transport direction HY1 (a direction corresponding to the direction in which the print medium 3 is transported by the transport mechanism 106) has a dimension Ly. In addition, as illustrated in FIG. 6A, in the captured image G1, the dimension Lx is longer than the dimension Ly. Thus, the capturing area SA is a rectangular area in which a length in the perpendicular direction TY1 has a dimension Lx and a length in the transport direction HY1 has a dimension Ly.

FIG. 6A illustrates a captured image G1 obtained by capturing an image of the unprinted area corresponding to the capturing area SA in which brightness unevenness occurs by the LED light source 73a and the LED light source 73b. That is, FIG. 6A illustrates brightness unevenness. In FIG. 6A, brightness is dark around the center of the captured image G1 in the perpendicular direction TY1, and brightness becomes brighter as the position is closer to the direction TY11 (the direction corresponding to the other movement direction of the carriage 6) and the direction TY12 (the direction corresponding to the one movement direction of the carriage 6).

Figure 6B:
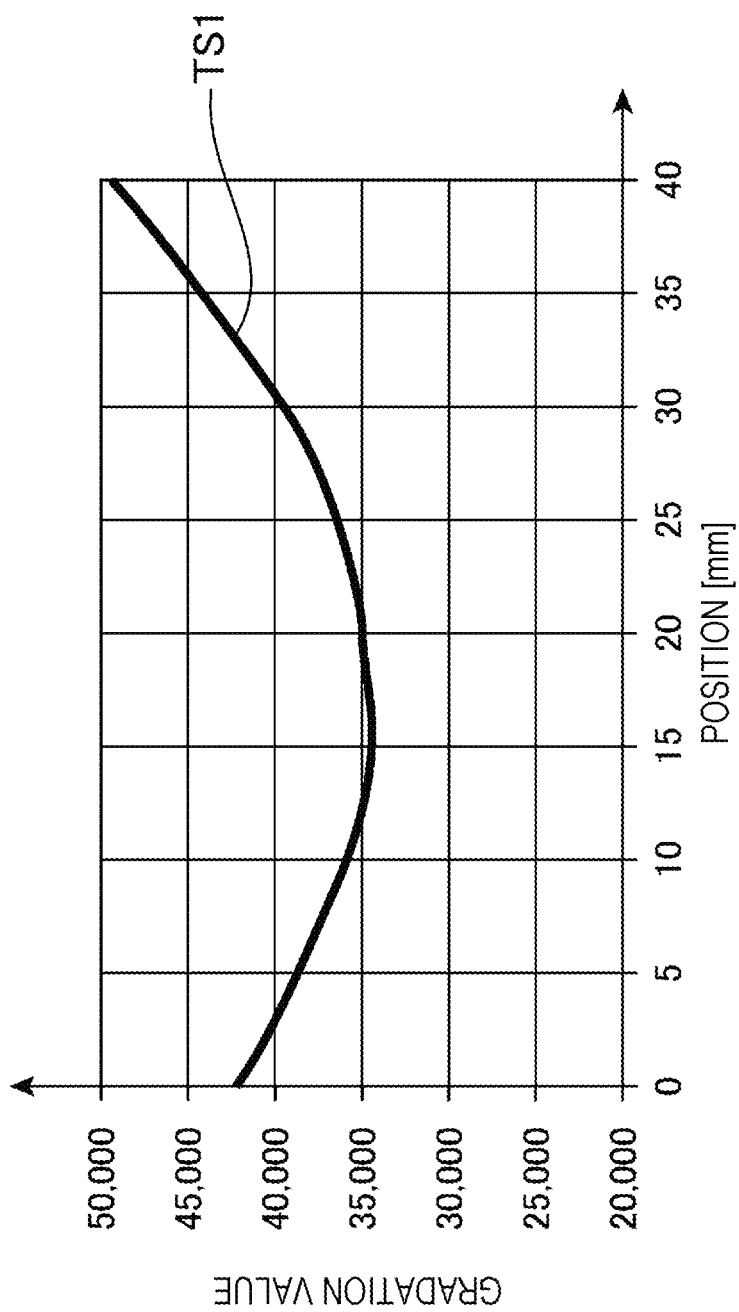
FIG. 6B is a graph illustrating an example of a characteristic of gradation values of the unprinted area.

FIG. 6B is a graph illustrating an example of a characteristic TS1 of gradation values of the unprinted area.

The characteristic TS1 illustrated in FIG. 6B is a characteristic of gradation values of pixels of the captured image G1 with respect to a position of an area A1 of the captured image G1 illustrated in FIG. 6A in the perpendicular direction TY1.

In FIG. 6B, a vertical axis represents gradation values when expressed in 16 bits. In addition, in FIG. 6B, a horizontal axis represents a position of the area A1 in the perpendicular direction TY1, and a unit of the horizontal axis is millimeter (mm). In FIG. 6B, a position of a pixel of the captured image G1 that is positioned closest to the direction TY11 is set as the origin of the horizontal axis. As illustrated in FIG. 6B, the horizontal axis illustrates a range of 0 mm to 40 mm, and thus a length of the area A1 in the perpendicular direction TY1, that is, a dimension Lx of the capturing area SA is 40 mm.

As described above, the characteristic TS1 illustrated in FIG. 6B is a characteristic of gradation values of pixels of the area A1 of the captured image G1 illustrated in FIG. 6A. In FIG. 6A, the area A1 is a rectangular area in which a length in the perpendicular direction TY1 has a dimension Lxa1 and a length in the transport direction HY1 has a dimension Lya1. The dimension Lxa1 is the same as the dimension Lx.

That is, the characteristic TS1 of FIG. 6B is a characteristic of average gradation values obtained by averaging gradation values of pixels of an area of the region A1 that is elongated in the transport direction HY1 (an area in a direction in which the dimension Lya1 extends) with respect to a position of the area A1 in the perpendicular direction TY1. As illustrated in FIG. 6B, the characteristic TS1 is a U-shaped characteristic in which the gradation value decreases as the position is closer to the center of the captured image G1 in the perpendicular direction TY1. As is clear from the characteristic TS1 of FIG. 6B, the brightness unevenness of the captured image G1 is brightness unevenness in which brightness is dark around the center of the captured image G1 in the perpendicular direction TY1 and brightness becomes brighter as the position is closer to the direction TY11 and the direction TY12.

Returning to the explanation of the flowchart illustrated in FIG. 5, when the unprinted area is captured by the camera 72, the controller 100 causes the printer 105 to print the test pattern TP on the print surface 3a of the print medium 3 based on the test pattern data 107 stored in the storage 101 (step SA3). As described above, the test pattern data 107 includes the first test pattern data 107a and the second test pattern data 107b. Thus, the printed test pattern TP includes the first test pattern TP1 and the second test pattern TP2. In the present embodiment, the controller 100 causes the carriage 6 to move in the direction TY12, causes the transport mechanism 106 to transport the print medium 3, and causes the printer 105 to print the first test pattern TP1 on the print medium 3 based on the first test pattern data 107a. In addition, the controller 100 causes the carriage 6 to move in the direction TY11, causes the transport mechanism 106 to transport the print medium 3, and causes the printer 105 to print the second test pattern TP2 on the print medium 3 based on the second test pattern data 107b.

Next, when the test pattern TP is printed, the controller 100 causes the camera 72 to capture an image of the printed test pattern TP (step SA4).

FIG. 7A is a diagram illustrating an example of a captured image G2 of the test pattern TP.

The captured image G2 illustrated in FIG. 7A is a captured image corresponding to the capturing area SA of the camera 72. As illustrated in FIG. 7A, the captured image G2 is a rectangular-shaped captured image, a length of the captured image G2 in the perpendicular direction TY1 (a direction corresponding to a movement direction of the carriage 6) has a dimension Lx, and a length of the captured image G2 in the transport direction HY1 (a direction corresponding to the direction in which the print medium 3 is transported by the transport mechanism 106) has a dimension Ly. As illustrated in FIG. 7A, the captured image G2 includes two first test patterns TP1 positioned on the downstream side than a center portion TBy in the transport direction HY1 is, and two second test patterns TP2 positioned on the upstream side than the center portion TBy is. In addition, the captured image G2 includes one first test pattern TP1 and one second test pattern TP2 in each of the direction TY11 and the direction TY12, the one first test pattern TP1 being positioned closer to the direction TY11 (a direction corresponding to the other movement direction of the carriage 6) than a center portion TBx in the perpendicular direction TY1 is, and the one second test pattern TP2 being positioned closer to the direction TY12 (a direction corresponding to the one movement direction of the carriage 6) than the center portion TBx is.

Therefore, when capturing the test pattern TP in step SA4, the controller 100 adjusts the capturing area SA of the camera 72 and a position of the print medium 3 such that two first test patterns TP1 and two second test patterns TP2 printed on the print medium 3 are included in the capturing area SA, and causes the camera 72 to capture an image of the test pattern TP.

FIG. 7A illustrates a captured image G2 obtained by capturing an image of the capturing area SA in which brightness unevenness occurs by the LED light source 73a and the LED light source 73b. That is, the brightness unevenness illustrated in FIG. 7A is brightness unevenness in which brightness is dark around the center of the captured image G2 in the perpendicular direction TY1 and brightness becomes brighter as the position is closer to the direction TY11 and the direction TY12.

Figure 7B:
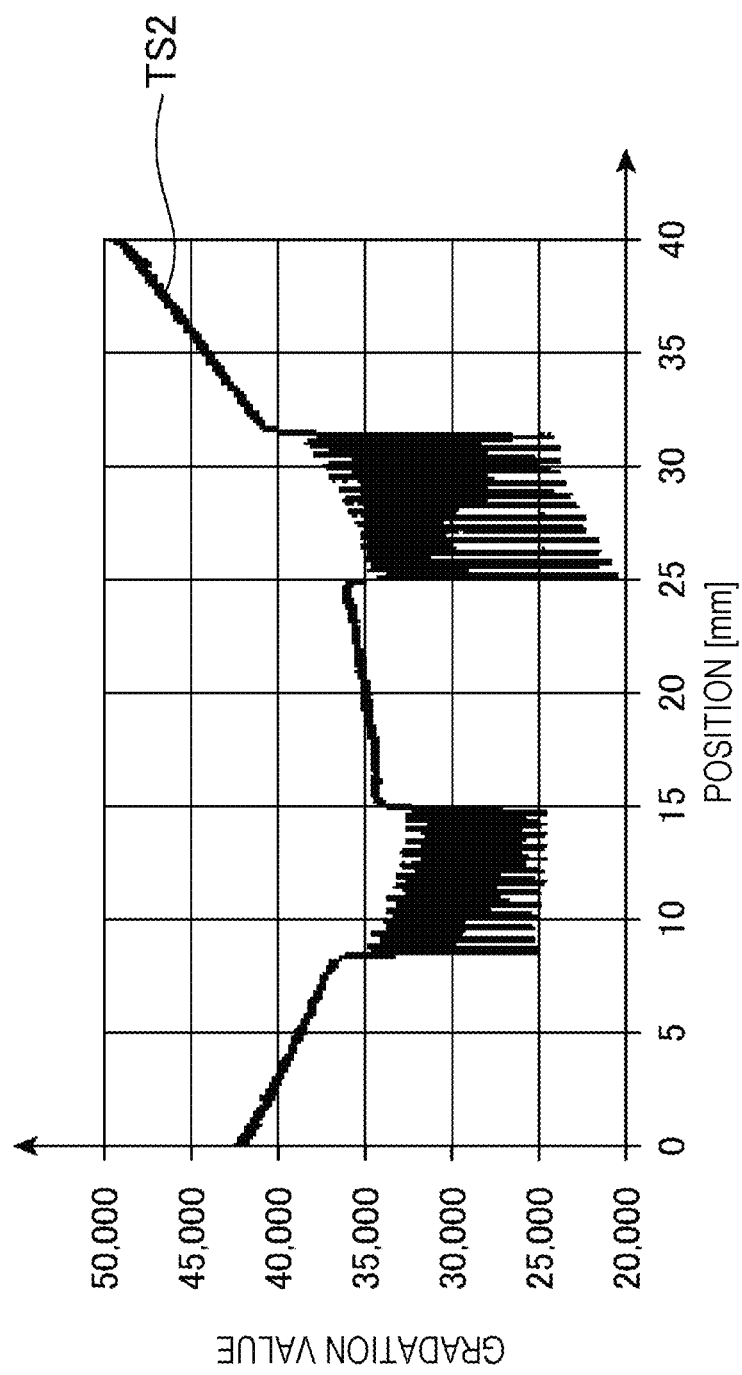
FIG. 7B is a graph illustrating an example of a characteristic of gradation values of a first test pattern.

FIG. 7B is a graph illustrating an example of a characteristic TS2 of gradation values of the first test pattern TP1.

The characteristic TS2 illustrated in FIG. 7B is a characteristic of gradation values of pixels of the captured image G2 with respect to a position of an area A1 of the captured image G2 illustrated in FIG. 7A in the perpendicular direction TY1. The area A1 illustrated in FIG. 7A and the area A1 illustrated in FIG. 6A are the same area.

In FIG. 7B, a vertical axis represents gradation values when expressed in 16 bits. In addition, in FIG. 7B, a horizontal axis represents a position in the perpendicular direction TY1, and a unit of the horizontal axis is millimeter (mm). In FIG. 7B, a position of a pixel of the captured image G2 that is positioned closest to the direction TY11 is set as the origin of the horizontal axis.

As described above, the characteristic TS2 illustrated in FIG. 7B is a characteristic of gradation values of pixels of the area A1 of the captured image G2 illustrated in FIG. 7A. The characteristic TS2 of FIG. 7B is a characteristic of average gradation values obtained by averaging gradation values of pixels of an area of the area A1 that is elongated in the transport direction HY1 (an area in a direction in which the dimension Lya1 extends) with respect to a position of the area A1 in the perpendicular direction TY1. As illustrated in FIG. 7B, the characteristic TS2 is a U-shaped characteristic in which the gradation value decreases as the position is closer to the center of the captured image G2 in the perpendicular direction TY1. As is clear from FIG. 7B, the brightness unevenness of the captured image G2 is brightness unevenness in which brightness is dark around the center of the captured image G2 in the perpendicular direction TY1 and brightness becomes brighter as the position is closer to the direction TY11 and the direction TY12.

In addition, as illustrated in FIG. 7B, the characteristic TS2 represents that the gradation value decreases at a position corresponding to the ruled line KS of the first test pattern TP1. More specifically, as illustrated in FIG. 7A, each of the first test patterns TP1 of the captured image G2 includes 13 ruled lines KS. Thus, the characteristic TS2 represents a characteristic including 13 points at which the gradation value becomes the minimum value in a range of approximately 7 mm to approximately 15 mm, and including 13 points at which the gradation value becomes the minimum value in a range of approximately 25 mm to approximately 33 mm.

Returning to the explanation of the flowchart of FIG. 5, when the test pattern TP is captured by the camera 72, the controller 100 acquires corrected captured-image-data (step SA5) based on the captured image data representing the captured image G1 of the unprinted area that is captured in step SA2 (hereinafter, referred to as "captured-image-data-of-unprinted-area") (first captured image data) and the captured image data representing the captured image G2 of the test pattern that is captured in step SA3 (hereinafter, referred to as "captured-image-data-of-test-pattern") (second captured image data).

Here, step SA5 will be described in detail.

In step SA5, the controller 100 acquires corrected captured-image-data, for example, by executing an arithmetic operation based on the following Equation (1).

$$HGS = K \times (PGS/MGS) \qquad \text{Equation (1)}$$

In Equation (1), HGS represents a gradation value of each pixel of the captured image represented by the corrected captured-image-data. In addition, PGS represents a gradation value of each pixel of the captured image of the test pattern that is represented by the captured-image-data-of-test-pattern. In addition, MGS represents a gradation value of each pixel of the captured image represented by the captured-image-data-of-unprinted-area. In addition, K represents a gradation value of a target pixel.

"(PGS/MGS)" in Equation (1) represents a ratio between a gradation value of a pixel at a certain position on the captured-image-data-of-test-pattern and a gradation value of a pixel at a corresponding position on the captured-image-data-of-unprinted-area. Thus, by calculating "(PGS/MGS)" of Equation (1) for all pixels of the captured-image-data-of-test-pattern, it is possible to calculate a ratio of gradation values of all pixels of the captured-image-data-of-test-pattern with respect to gradation values of all pixels of the captured-image-data-of-unprinted-area. Here, by multiplying the ratio of gradation values of all pixels of the captured-image-data-of-test-pattern with respect to gradation values of all pixels of the captured-image-data-of-unprinted-area by a gradation value of a target pixel, it is possible to generate (acquire) corrected captured-image-data including pixels with gradation values which are appropriately adjusted by reflecting the ratio.

In order to calculate the ratio by division, the controller 100 calculates a ratio of gradation values of pixels of the captured-image-data-of-test-pattern including brightness unevenness with respect to gradation values of pixels of the captured-image-data-of-unprinted-area including brightness unevenness. Thus, an influence by brightness unevenness included in the captured-image-data-of-test-pattern can be reduced. Therefore, it is possible to acquire corrected captured-image-data in which brightness unevenness is reduced. This correction is called so-called shading correction, and the corrected captured-image-data is shading-corrected captured-image-data-of-test-pattern.

Figure 8A:
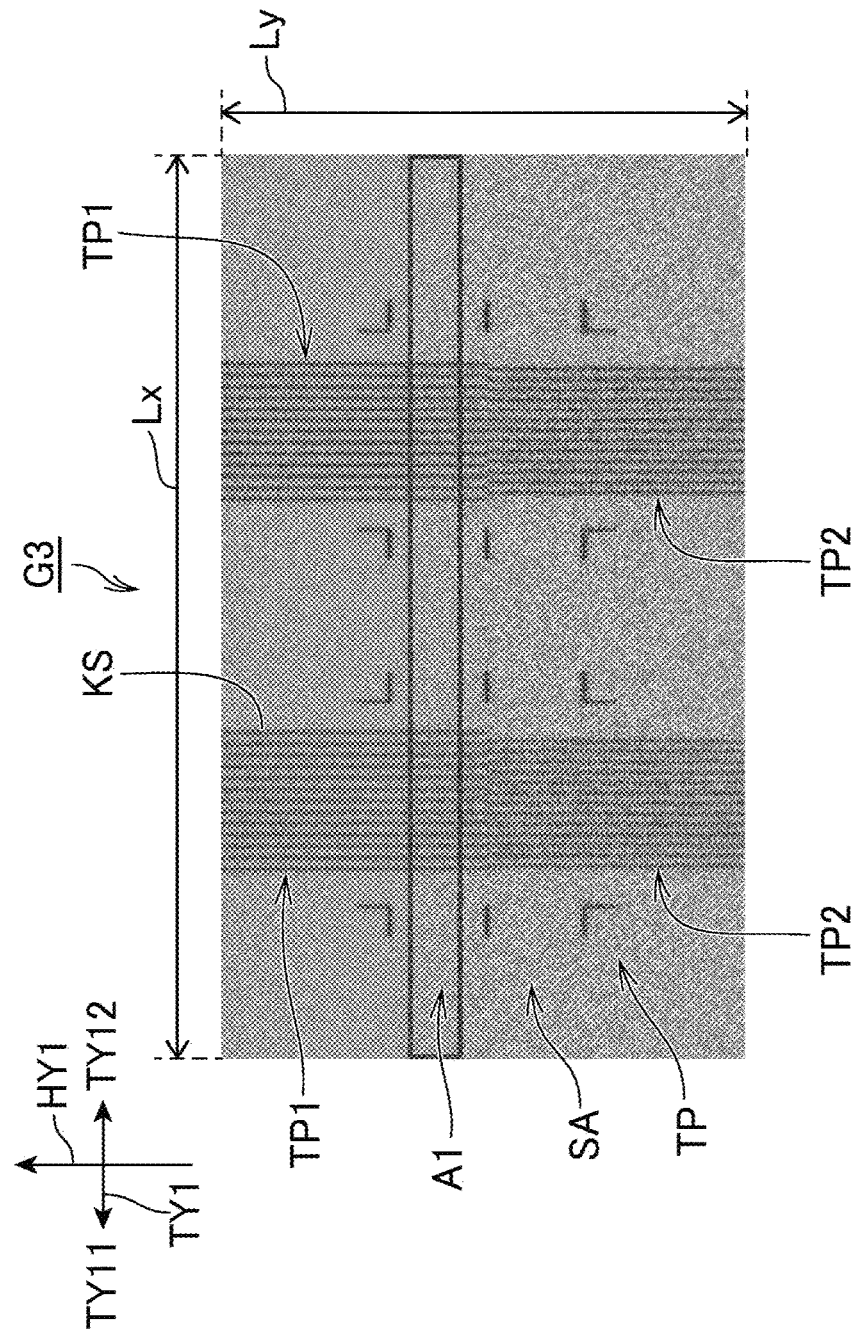
FIG. 8A is a diagram illustrating an example of a captured image represented by corrected captured-image-data.

FIG. 8A is a diagram illustrating an example of a captured image G3 represented by the corrected captured-image-data.

The captured image G3 illustrated in FIG. 8A is a captured image represented by the corrected captured-image-data which is acquired in step SA5 based on the captured-image-data-of-unprinted-area representing the captured image G1 and the captured-image-data-of-test-pattern representing the captured image G2.

As illustrated in FIG. 8A, the captured image G3 is a rectangular-shaped image, a length of the captured image G3 in the perpendicular direction TY1 (a direction corresponding to a movement direction of the carriage 6) has a dimension Lx, and a length of the captured image G3 in the transport direction HY1 (a direction corresponding to the direction in which the print medium 3 is transported by the transport mechanism 106) has a dimension Ly. As illustrated in FIG. 8A, the captured image G3 includes two first test patterns TP1 and two second test patterns TP2.

When comparing the captured image G3 illustrated in FIG. 8A and the captured image G2 illustrated in FIG. 7A, brightness unevenness is included in the captured image G2 illustrated in FIG. 7A, whereas brightness unevenness is reduced in the captured image G3 illustrated in FIG. 8A. This is because the corrected captured-image-data representing the captured image G3 is shading-corrected captured-image-data-of-test-pattern.

Figure 8B:
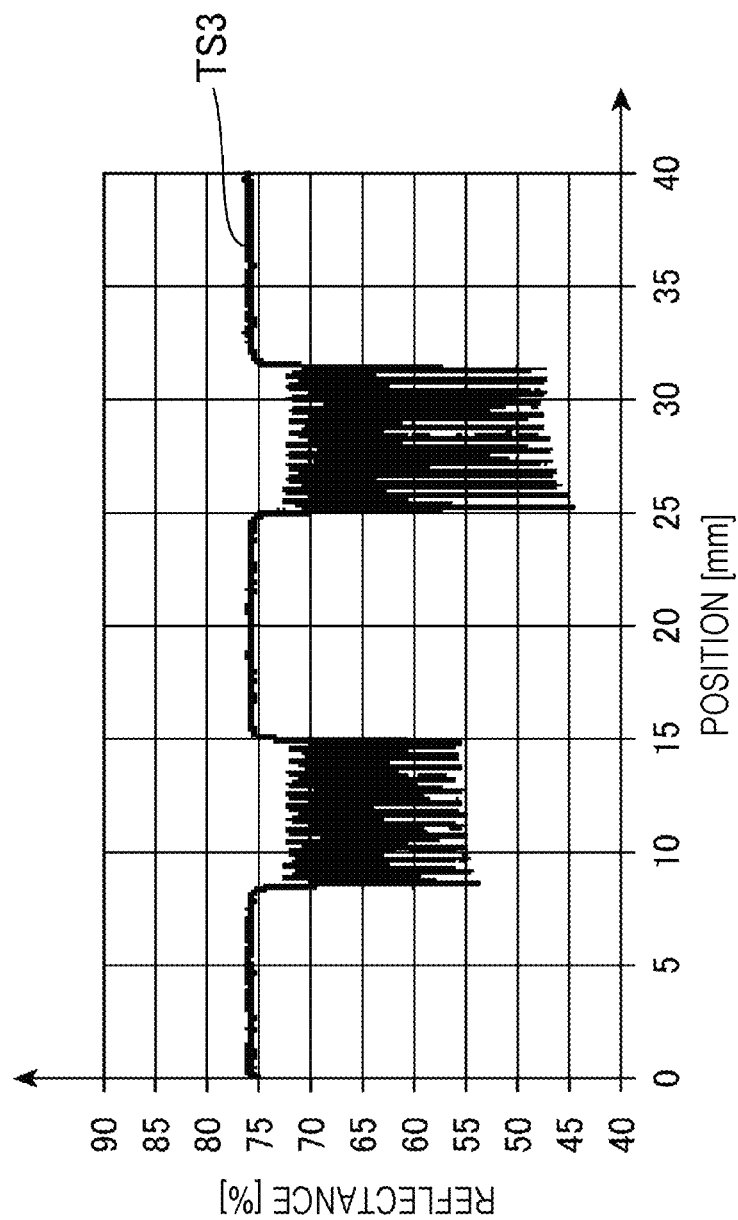
FIG. 8B is a graph illustrating an example of a characteristic of gradation values of a first test pattern.

FIG. 8B is a graph illustrating an example of a characteristic TS3 of gradation values of the first test pattern TP1 of the captured image G3.

The characteristic TS3 illustrated in FIG. 8B is a characteristic of gradation values of pixels of the captured image G3 with respect to a position of an area A1 of the captured image G3 illustrated in FIG. 8A in the perpendicular direction TY1. The area A1 illustrated in FIG. 8A, the area A1 illustrated in FIG. 7A, and the area A1 illustrated in FIG. 6A are the same area.

In FIG. 8B, a vertical axis represents percentages of gradation values of the captured image G3 with respect to, for example, a white gradation value. That is, the vertical axis represents reflectance of irradiation light in the capturing area SA. In addition, in FIG. 8B, a horizontal axis represents a position in the perpendicular direction TY1, and a unit of the horizontal axis is millimeter (mm). In FIG. 8B, a position of a pixel of the captured image G3 that is positioned closest to the direction TY11 (a direction corresponding to the one movement direction of the carriage 6) is set as the origin of the horizontal axis.

As described above, the characteristic TS3 illustrated in FIG. 8B is a characteristic of gradation values of pixels of the area A1 of the captured image G3 illustrated in FIG. 8A. Thus, the characteristic TS3 of FIG. 8B is a characteristic of average gradation values obtained by averaging gradation values of pixels of an area of the region A1 that is elongated in the transport direction HY1 (an area in a direction in which the dimension Lya1 extends) with respect to the area A1 in the perpendicular direction TY1. As illustrated in FIG. 8B, the characteristic TS3 does not represent a U-shaped characteristic as illustrated in FIG. 7B. That is, FIG. 8B illustrates that the captured image G3 is a captured image in which brightness unevenness is reduced.

In addition, as illustrated in FIG. 8B, the characteristic TS3 represents that the gradation value decreases at a position corresponding to the ruled line KS of the first test pattern TP1. More specifically, as illustrated in FIG. 8A, each of the first test patterns of the captured image G3 includes 13 ruled lines KS. Thus, the characteristic TS3 represents a characteristic including 13 points at which the gradation value becomes the minimum value in a range of approximately 7 mm to approximately 15 mm, and including 13 points at which the gradation value becomes the minimum value in a range of approximately 25 mm to approximately 33 mm.

In this manner, the controller 100 of the printing apparatus 1 acquires shading-corrected captured-image-data based on the captured-image-data-of-unprinted-area and the captured-image-data-of-test-pattern. Thus, it is possible to acquire the corrected captured-image-data in which brightness unevenness is reduced. On the other hand, when the print medium 3 includes textures TC, in the operation illustrated in FIG. 5, there is a case where the controller 100 cannot acquire accurate corrected captured-image-data. An operation in this case will be described.

FIG. 9A is a diagram illustrating an example of a captured image G4 of an unprinted area on the print medium 3 including textures TC.

The captured image G4 illustrated in FIG. 9A is a captured image corresponding to the capturing area SA of the camera 72. As illustrated in FIG. 9A, the captured image G4 is a rectangular-shaped captured image, a length of the captured image G4 in the perpendicular direction TY1 (a direction corresponding to a movement direction of the carriage 6) has a dimension Lx, and a length of the captured image G4 in the transport direction HY1 (a direction corresponding to the direction in which the print medium 3 is transported by the transport mechanism 106) has a dimension Ly.

As illustrated in the captured image G4 of FIG. 9A, the print medium 3 includes a plurality of textures TC which are extended along the transport direction HY1 and are formed side by side at predetermined intervals in the perpendicular direction TY1.

FIG. 9A illustrates a captured image G4 obtained by capturing an image of the unprinted area corresponding to the capturing area SA in which brightness unevenness occurs by the LED light source 73a and the LED light source 73b. That is, FIG. 9A illustrates brightness unevenness. In FIG. 9A, brightness is dark around the center of the captured image G4 in the perpendicular direction TY1, and brightness becomes brighter as the position is closer to the direction TY11 (the direction corresponding to the other movement direction of the carriage 6) and the direction TY12 (the direction corresponding to the one movement direction of the carriage 6).

FIG. 9B is a graph illustrating a characteristic TS4 of gradation values of the unprinted area.

The characteristic TS4 illustrated in FIG. 9B is a characteristic of gradation values of pixels of an area A2 of the captured image G4 illustrated in FIG. 9A with respect to a position of the area A2 of the captured image G4 in the perpendicular direction TY1.

In FIG. 9B, a vertical axis represents gradation values when expressed in 16 bits. In addition, in FIG. 9B, a horizontal axis represents a position in the perpendicular direction TY1, and a unit of the horizontal axis is millimeter (mm). In FIG. 9B, a position of a pixel of the captured image G4 that is positioned closest to the direction TY11 is set as the origin of the horizontal axis.

As described above, the characteristic TS4 illustrated in FIG. 9B is a characteristic of gradation values of pixels of the area A2 of the captured image G4 illustrated in FIG. 9A. In FIG. 9A, the area A2 is a rectangular area in which a length in the perpendicular direction TY1 has a dimension Lxa2 and a length in the transport direction HY1 has a dimension Lya2.

The characteristic TS4 of FIG. 9B is a characteristic of average gradation values obtained by averaging gradation values of pixels of an area of the area A2 that is elongated in the transport direction HY1 (an area in a direction in which the dimension Lya2 extends) with respect to a position of the area A2 in the perpendicular direction TY1. As illustrated in FIG. 9B, the characteristic TS4 is a U-shaped characteristic in which the gradation value decreases as the position is closer to the center of the captured image G4 in the perpendicular direction TY1. As is clear from FIG. 9B, the brightness unevenness of the captured image G4 is brightness unevenness in which brightness is dark around the center of the captured image G4 in the perpendicular direction TY1 and brightness becomes brighter as the position is closer to the direction TY11 and the direction TY12.

In addition, the characteristic TS4 of FIG. 9B illustrates a characteristic in which the gradation value excessively decreases at a position corresponding to the texture TC. In FIG. 9B, arrows represent a part of positions of the textures TC of the print medium 3 in the perpendicular direction TY1. As illustrated in FIG. 9B, at the position represented by the arrow, the gradation value excessively decreases.

FIG. 10A is a diagram illustrating an example of a captured image G5 of the test pattern TP.

The captured image G5 illustrated in FIG. 10A is a captured image corresponding to the capturing area SA of the camera 72. As illustrated in FIG. 10A, the captured image G5 is a rectangular-shaped captured image, a length of the captured image G5 in the perpendicular direction TY1 (a direction corresponding to a movement direction of the carriage 6) has a dimension Lx, and a length of the captured image G5 in the transport direction HY1 (a direction corresponding to the direction in which the print medium 3 is transported by the transport mechanism 106) has a dimension Ly. As illustrated in FIG. 10A, the captured image G5 includes two first test patterns TP1 positioned on the downstream side than a center portion TBy in the transport direction HY1 is, and two second test patterns TP2 positioned on the upstream side than the center portion TBy is. In addition, the captured image G5 includes one first test pattern TP1 and one second test pattern TP2 in each of the direction TY11 and the direction TY12, the one first test pattern TP1 being positioned closer to the direction TY11 (a direction corresponding to the other movement direction of the carriage 6) than a center portion TBx in the perpendicular direction TY1 is, and the one second test pattern TP2 being positioned closer to the direction TY12 (a direction corresponding to the one movement direction of the carriage 6) than the center portion TBx is.

Therefore, when capturing the test pattern TP, the controller 100 adjusts the capturing area SA of the camera 72 and a position of the print medium 3 such that two first test patterns TP1 and two second test patterns TP2 printed on the print medium 3 are included in the capturing area SA, and causes the camera 72 to capture an image of the test pattern TP.

As illustrated in the captured image G5 of FIG. 10A, the print medium 3 includes a plurality of textures TC which are extended along the transport direction HY1 and are formed side by side at predetermined intervals in the perpendicular direction TY1.

FIG. 10A illustrates a captured image G5 obtained by capturing an image of the capturing area SA in which brightness unevenness occurs by the LED light source 73a and the LED light source 73b. That is, FIG. 10A illustrates brightness unevenness in which brightness is dark around the center of the captured image G5 in the perpendicular direction TY1 and brightness becomes brighter as the position is closer to the direction TY11 and the direction TY12.

Figure 10B:
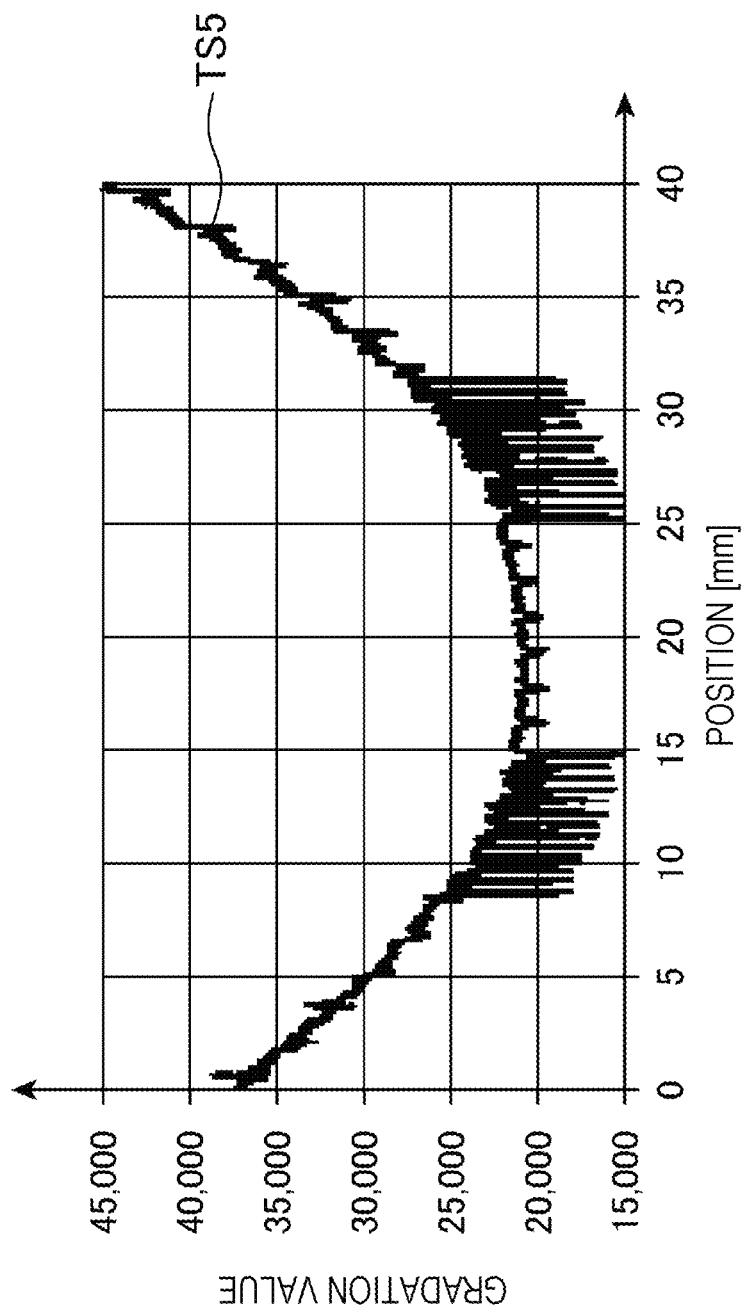
FIG. 10B is a graph illustrating an example of a characteristic of gradation values of the first test pattern.

FIG. 10B is a graph illustrating an example of a characteristic TS5 of gradation values of the first test pattern TP1.

The characteristic TS5 illustrated in FIG. 10B is a characteristic of gradation values of pixels of the captured image G5 with respect to a position of an area A2 of the captured image G5 illustrated in FIG. 10A in the perpendicular direction TY1. The area A2 illustrated in FIG. 10A and the area A2 illustrated in FIG. 9A are the same area.

In FIG. 10B, a vertical axis represents gradation values when expressed in 16 bits. In addition, in FIG. 10B, a horizontal axis represents a position in the perpendicular direction TY1, and a unit of the horizontal axis is millimeter (mm). In FIG. 10B, a position of a pixel of the captured image G5 that is positioned closest to the direction TY11 is set as the origin of the horizontal axis.

As described above, the characteristic TS5 illustrated in FIG. 10B is a characteristic of gradation values of pixels of the area A2 of the captured image G5 illustrated in FIG. 10A. Thus, the characteristic TS5 of FIG. 10B is a characteristic of average gradation values obtained by averaging gradation values of pixels of an area of the region A2 that is elongated in the transport direction HY1 (an area in a direction in which the dimension Lya2 extends) with respect to the area A2 in the perpendicular direction TY1. As illustrated in FIG. 10B, the characteristic TS5 is a U-shaped characteristic in which the gradation value decreases as the position is closer to the center of the captured image G5 in the perpendicular direction TY1. As is clear from FIG. 10B, the brightness unevenness of the captured image G5 is brightness unevenness in which brightness is dark around the center of the captured image G5 in the perpendicular direction TY1 and brightness becomes brighter as the position is closer to the direction TY11 and the direction TY12.

In addition, as illustrated in FIG. 10B, the characteristic TS5 represents that the gradation value decreases at a position corresponding to the ruled line KS of the first test pattern TP1. More specifically, as illustrated in FIG. 10A, each of the first test patterns of the captured image G5 includes 13 ruled lines KS. Thus, the characteristic TS5 represents a characteristic including 13 points at which the gradation value becomes the minimum value in a range of approximately 7 mm to approximately 15 mm, and including 13 points at which the gradation value becomes the minimum value in a range of approximately 25 mm to approximately 33 mm.

In addition, similar to the characteristic TS4 illustrated in FIG. 9B, the characteristic TS5 illustrated in FIG. 10B illustrates a characteristic in which the gradation value excessively decreases at a position corresponding to the texture TC.

FIG. 11A is a diagram illustrating an example of a captured image G6 represented by the corrected captured-image-data.

The captured image G6 illustrated in FIG. 11A is a captured image represented by the corrected captured-image-data which is acquired by executing shading correction based on the captured-image-data-of-unprinted-area representing the captured image G4 and the captured-image-data-of-test-pattern representing the captured image G5.

As illustrated in FIG. 11A, the captured image G6 is a rectangular-shaped captured image, a length of the captured image G6 in the perpendicular direction TY1 (a direction corresponding to a movement direction of the carriage 6) has a dimension Lx, and a length of the captured image G6 in the transport direction HY1 (a direction corresponding to the direction in which the print medium 3 is transported by the transport mechanism 106) has a dimension Ly. As illustrated in FIG. 11A, the captured image G6 includes two first test patterns TP1 and two second test patterns TP2.

When comparing the captured image G6 illustrated in FIG. 11A and the captured image G5 illustrated in FIG. 10A, brightness unevenness is included in the captured image G5 illustrated in FIG. 10A, whereas brightness unevenness is reduced in the captured image G6 illustrated in FIG. 11A. This is because the corrected captured-image-data representing the captured image G6 is shading-corrected captured-image-data-of-test-pattern.

Figure 11B:
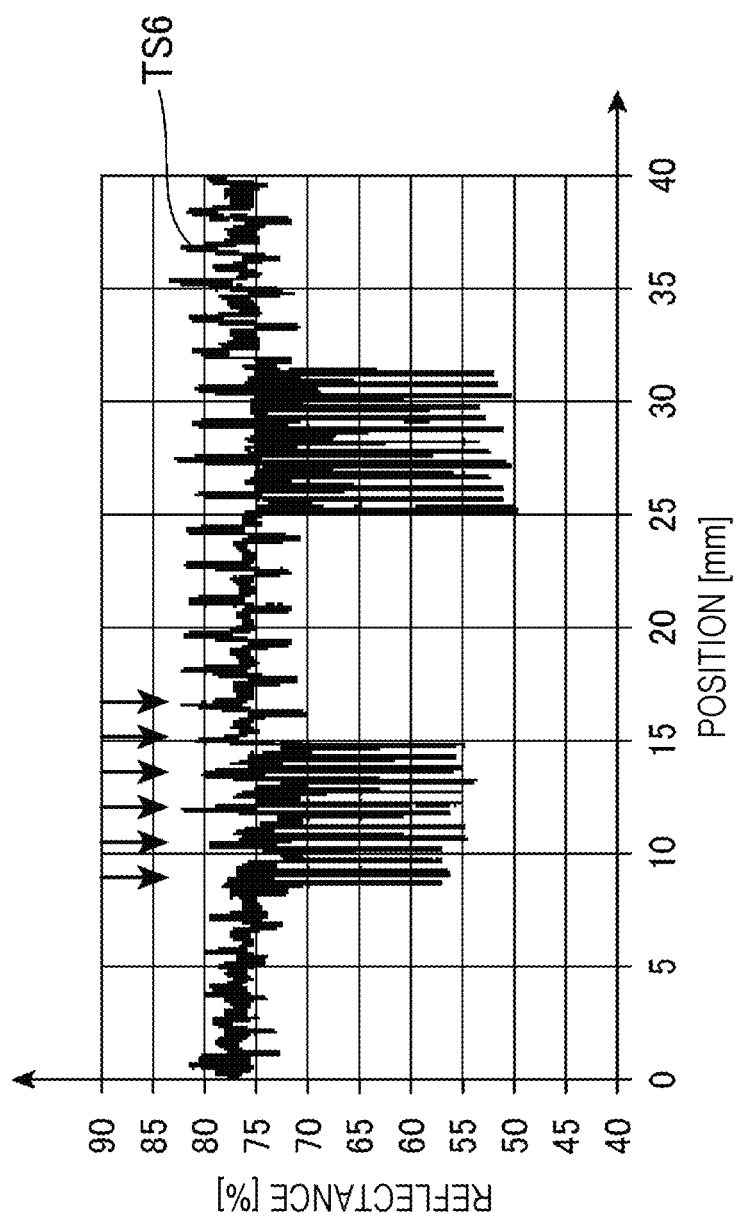
FIG. 11B is a graph illustrating an example of a characteristic of gradation values of a first test pattern.

FIG. 11B is a graph illustrating an example of a characteristic TS6 of gradation values of the first test pattern TP1 of the captured image G6.

The characteristic TS6 illustrated in FIG. 11B is a characteristic of gradation values of pixels of an area A2 of the captured image G6 illustrated in FIG. 11A with respect to a position of the area A2 of the captured image G6 in the perpendicular direction TY1. The area A2 illustrated in FIG. 11A, the area A2 illustrated in FIG. 10A, and the area A2 illustrated in FIG. 9A are the same area.

In FIG. 11B, a vertical axis represents percentages of gradation values of the captured image G6 with respect to, for example, a white gradation value. That is, the vertical axis represents reflectance of irradiation light in the capturing area SA. In addition, in FIG. 11B, a horizontal axis represents a position in the perpendicular direction TY1, and a unit of the horizontal axis is millimeter (mm). In FIG. 11B, a position of a pixel of the captured image G6 that is positioned closest to the direction TY11 (a direction corresponding to the one movement direction of the carriage 6) is set as the origin of the horizontal axis.

As described above, the characteristic TS6 illustrated in FIG. 11B is a characteristic of gradation values of pixels of the area A2 of the captured image G6 illustrated in FIG. 11A. Thus, the characteristic TS6 of FIG. 11B is a characteristic of average gradation values obtained by averaging gradation values of pixels of an area of the region A2 in the transport direction HY1 (an area having the dimension Lya2) with respect to the area A2 in the perpendicular direction TY1. As illustrated in FIG. 11B, the characteristic TS6 does not represent a U-shaped characteristic as illustrated in FIG. 10B. That is, FIG. 11B illustrates that the captured image G6 is a captured image in which brightness unevenness is reduced.

In addition, as illustrated in FIG. 11B, the characteristic TS6 represents that the gradation value decreases at a position corresponding to the ruled line KS of the first test pattern TP1. More specifically, as illustrated in FIG. 11A, each of the first test patterns of the captured image G6 includes 13 ruled lines KS. Thus, the characteristic TS6 represents a characteristic including 13 points at which the gradation value becomes the minimum value in a range of approximately 7 mm to approximately 15 mm, and including 13 points at which the gradation value becomes the minimum value in a range of approximately 25 mm to approximately 33 mm.

As illustrated in FIG. 11A and FIG. 11B, even when the print medium 3 includes the textures TC, the controller 100 can acquire corrected captured-image-data representing the captured image G6 in which brightness unevenness is reduced by executing shading correction based on the captured-image-data-of-unprinted-area representing the captured image G4 and the captured-image-data-of-test-pattern representing the captured image G5.

On the other hand, in a case where the print medium 3 includes the textures TC, when shading correction is executed, as represented by arrows of FIG. 11B, the reflectance at the position corresponding to the texture TC increases. This is because, in Equation (1) when acquiring the corrected captured-image-data, the gradation value of each pixel of the captured-image-data-of-test-pattern is divided by the gradation value of each pixel of the captured-image-data-of-unprinted-area. Thus, in a case where a position of the texture TC and a position of the ruled line KS of the test pattern TP overlap with each other, as a gradation value of a pixel corresponding to the position of the texture TC included in the captured-image-data-of-unprinted-area becomes lower (that is, as the color becomes darker), the gradation value of the pixel corresponding to the position of the texture TC approximates to a gradation value of a pixel corresponding to the position of the ruled line KS. Thus, in the corrected captured-image-data, the gradation value of the pixel corresponding to the position of the ruled line KS is increased. That is, in a case where the position of the texture TC overlaps with the position of the ruled line KS of the test pattern TP, in the corrected captured-image-data, the gradation value of the pixel corresponding to the position of the ruled line KS is increased. For this reason, the higher the gradation value of the pixel corresponding to the position of the texture TC, the higher the gradation value of the pixel corresponding to the position of the ruled line KS of the test pattern TP on the corrected captured-image-data. As a result, it is difficult to recognize the minimum value representing the ruled line KS. That is, in a case where the print medium 3 includes the texture TC, there is a case where the controller 100 cannot acquire accurate corrected captured-image-data.

In ejection timing adjustment to be described, characteristics based on the corrected captured-image-data are used. Thus, when accurate corrected captured-image-data cannot be acquired, the controller 100 cannot execute ejection timing adjustment with high accuracy.

Therefore, the printing apparatus 1 according to the present embodiment performs the following operation.

FIG. 12 is a flowchart illustrating an operation of the printing apparatus 1 according to the present embodiment.

In an explanation of FIG. 12, it is assumed that the print medium 3 includes at least a texture TC on the print surface 3*a*.

In addition, in the explanation of FIG. 12, it is assumed that the print medium 3 is a white print medium 3. That is, a color of the unprinted area is white.

In addition, in the explanation of FIG. 12, an operation from acquisition of the corrected captured-image-data to ejection timing adjustment using the corrected captured-image-data will be described.

As illustrated in FIG. 12, the controller 100 of the printing apparatus 1 determines whether to start an execution of ejection timing adjustment (step SB1). For example, in a case where the input device 102 detects an operation instructing an execution of ejection timing adjustment, the controller 100 determines to start an execution of ejection timing adjustment based on the input from the input device 102 (YES in step SB1). In addition, for example, in a case where a predetermined time period elapses after the previous execution of ejection timing adjustment, the controller 100 determines to start an execution of ejection timing adjustment in response to the elapse of the predetermined time period (YES in step SB1). In addition, for example, in a case where power is initially supplied to the printing apparatus 1, the controller 100 determines to start an execution of ejection timing adjustment in response to the power supply (YES in step SB1).

When the controller determines to start an execution of ejection timing adjustment (YES in step SB1), the controller 100 causes the camera 72 to capture an image of an unprinted area (step SB2). As described above, when the camera 72 captures an image, the controller 100 causes the LED light source 73*a* and the LED light source 73*b* to irradiate the print surface 3*a* of the print medium 3 with light by supplying power to the LED light source 73*a* and the LED light source 73*b*.

In the following description, it is assumed that the controller 100 acquires captured-image-data-of-unprinted-area representing the captured image G4 illustrated in FIG. 9A that is obtained by capturing using the camera 72 in step SB2.

Next, when the unprinted area is captured by the camera 72, the controller 100 causes the printer 105 to print the test pattern TP on the print surface 3*a* of the print medium 3 based on the test pattern data 107 stored in the storage 101 (step SB3). As described above, the test pattern data 107 includes the first test pattern data 107*a* and the second test pattern data 107*b*. Thus, the printed test pattern TP includes the first test pattern TP1 and the second test pattern TP2. In addition, as described above, the controller 100 causes the carriage 6 to move in the direction TY12, causes the transport mechanism 106 to transport the print medium 3, and causes the printer 105 to print the first test pattern TP1 on the print medium 3 based on the first test pattern data 107*a*. In addition, the controller 100 causes the carriage 6 to move in the direction TY11, causes the transport mechanism 106 to transport the print medium 3, and causes the printer 105 to print the second test pattern TP2 on the print medium 3 based on the second test pattern data 107*b*.

Next, when the test pattern TP is printed, the controller 100 causes the camera 72 to capture an image of the printed test pattern TP (step SB4).

In the following description, it is assumed that the controller 100 acquires captured-image-data-of-test-pattern representing the captured image G5 illustrated in FIG. 10A that is obtained by capturing using the camera 72 in step SB4.

Next, when the printed test pattern TP is captured by the camera 72, the controller 100 executes filter processing on the captured-image-data-of-unprinted-area of the captured image G4 obtained by capturing in step SB2, and executes smoothing such that gradation values of pixels of the captured-image-data-of-unprinted-area are smoothly changed in the capturing area SA (step SB5).

In step SB5, the controller 100 executes moving average filter processing or Gaussian filter processing as filter processing so as to smooth the captured-image-data-of-unprinted-area of the captured image G4.

Moving Average Filter Processing

The moving average filter processing is filter processing of calculating an average gradation value using gradation values of pixels positioned around one target pixel and replacing the average gradation value with a gradation value of the one target pixel. For example, in the moving average filter processing, in a case where one target pixel is set as a center and 24 pixels are positioned around the one target pixel, an average gradation value obtained by averaging gradation values of 25 pixels including the one target pixel is replaced with the gradation value of the one target pixel.

The controller 100 generates (acquires) smoothed captured-image-data-of-unprinted-area of the captured image G4 by executing the moving average filter processing on the captured-image-data-of-unprinted-area of the captured image G4.

Gaussian Filter Processing

The Gaussian filter processing is filter processing based on a fact that a gradation value of a pixel positioned around one target pixel has a value away from a gradation value of the one target pixel according to the Gaussian distribution as the pixel is positioned further away from a position of the one target pixel. In the Gaussian filter processing, considering that a gradation value of a pixel has a value according to the Gaussian distribution, weighting according to the Gaussian distribution is executed on the gradation value of the one target pixel. For example, in the Gaussian filter processing, in a case where one target pixel is set as a center and 24 pixels are positioned around the one target pixel, weighting of "36/256" is executed.

The controller 100 generates (acquires) smoothed captured-image-data-of-unprinted-area of the captured image G4 by executing the Gaussian filter processing on the captured-image-data-of-unprinted-area of the captured image G4.

In the smoothing of the captured-image-data-of-unprinted-area, the filter processing which is executed on the captured-image-data-of-unprinted-area is not limited to the moving average filter processing and the Gaussian filter processing as long as gradation values of pixels of the captured-image-data-of-unprinted-area of the capturing area SA can be smoothly changed in the capturing area SA by the filter processing.

FIG. 13A is a diagram illustrating an example of a captured image G7 represented by the captured-image-dataof-unprinted-area obtained by executing the filter processing on the captured-image-data-of-unprinted-area representing the captured image G4.

The captured image G7 illustrated in FIG. 13A is a captured image corresponding to the capturing area SA of the camera 72. As illustrated in FIG. 13A, the captured image G7 is a rectangular-shaped captured image, a length of the captured image G6 in the perpendicular direction TY1 (a direction corresponding to a movement direction of the carriage 6) has a dimension Lx, and a length of the captured image G6 in the transport direction HY1 (a direction corresponding to the direction in which the print medium 3 is transported by the transport mechanism 106) has a dimension Ly.

The captured image G7 of FIG. 13A is a captured image in which the texture TC becomes inconspicuous by smoothing using the filter processing, as compared with the captured image G4 illustrated in FIG. 9A.

FIG. 13A illustrates a captured image G7 obtained by capturing an image of the unprinted area corresponding to the capturing area SA in which brightness unevenness occurs by the LED light source 73a and the LED light source 73b. That is, FIG. 13A illustrates brightness unevenness. In FIG. 13A, brightness is dark around the center of the captured image G7 in the perpendicular direction TY1, and brightness becomes brighter as the position is closer to the direction TY11 (the direction corresponding to the other movement direction of the carriage 6) and the direction TY12 (the direction corresponding to the one movement direction of the carriage 6).

Figure 13B:
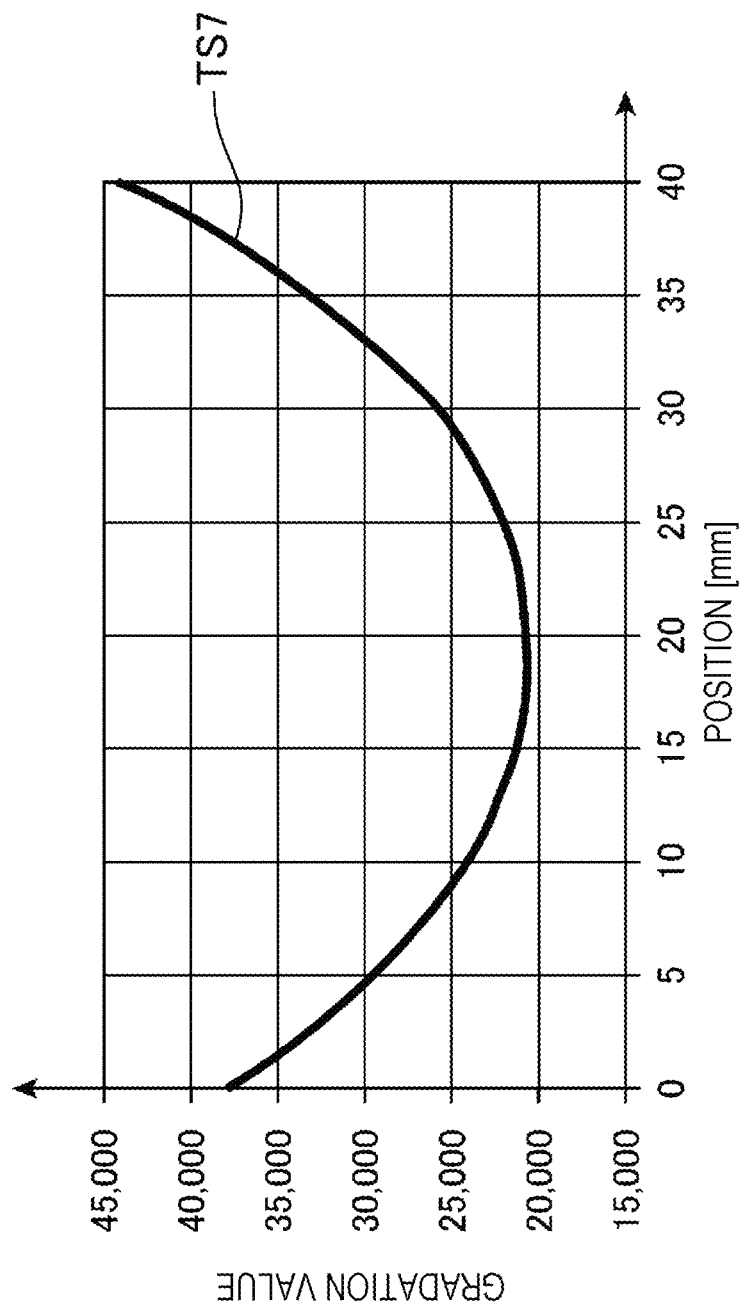
FIG. 13B is a graph illustrating an example of a characteristic of gradation values of an unprinted area.

FIG. 13B is a graph illustrating a characteristic TS7 of gradation values of the unprinted area.

The characteristic TS7 illustrated in FIG. 13B is a characteristic of gradation values of pixels of the captured image G7 with respect to a position of an area A3 of the captured image G7 illustrated in FIG. 13A in the perpendicular direction TY1.

In FIG. 13B, a vertical axis represents gradation values when expressed in 16 bits. In addition, in FIG. 13B, a horizontal axis represents a position in the perpendicular direction TY1, and a unit of the horizontal axis is millimeter (mm). In FIG. 13B, a position of a pixel of the captured image G7 that is positioned closest to the direction TY11 is set as the origin of the horizontal axis.

As described above, the characteristic TS7 illustrated in FIG. 13B is a characteristic of gradation values of pixels of the area A3 of the captured image G7 illustrated in FIG. 13A. In FIG. 13A, the area A3 is a rectangular area in which a length in the perpendicular direction TY1 has a dimension Lxa3 and a length in the transport direction HY1 has a dimension Lya3.

The characteristic TS7 illustrated in FIG. 13B is a characteristic of average gradation values obtained by averaging gradation values of pixels of an area of the area A3 that is elongated in the transport direction HY1 (an area in a direction in which the dimension Lya3 extends) with respect to a position of the area A3 in the perpendicular direction TY1. As illustrated in FIG. 13B, the characteristic TS7 is a U-shaped characteristic in which the gradation value decreases as the position is closer to the center of the captured image G7 in the perpendicular direction TY1. As is clear from FIG. 13B, the brightness unevenness of the captured image G7 is brightness unevenness in which brightness is dark around the center of the captured image G7 in the perpendicular direction TY1 and brightness becomes brighter as the position is closer to the direction TY11 and the direction TY12.

In addition, as compared with the characteristic TS4 illustrated in FIG. 9B, in the characteristic TS7 illustrated in FIG. 13B, a phenomenon in which the gradation value excessively decreases at a position corresponding to the texture TC is decreased. This is because the captured-image-data-of-unprinted-area representing the captured image G7 is smoothed captured-image-data-of-unprinted-area and a change between the gradation value corresponding to the position of the texture TC and the gradation value corresponding to a position other than the texture TC is smoothed.

In step SB5, the controller 100 does not execute filter processing on the captured-image-data-of-test-pattern representing the captured image G5 acquired in step SB4. As described above, the controller 100 executes the filter processing such that the gradation values of the pixels of the captured-image-data-of-unprinted-area are smoothly changed in the capturing area SA. On the other hand, when the filter processing is executed on the captured-image-data-of-test-pattern, in the captured-image-data-of-test-pattern representing the captured image G5, a gradation value corresponding to the test pattern TP approximates to a gradation value corresponding to a position other than the test pattern TP, and as a result, the gradation value corresponding to the test pattern TP becomes inconspicuous. That is, it is difficult to recognize the minimum value of the gradation value representing the ruled line KS of the test pattern TP, and as a result, the controller 100 cannot acquire accurate captured-image-data-of-test-pattern. In this case, the controller 100 cannot acquire accurate corrected captured-image-data. For this reason, the controller 100 does not execute the filter processing on the captured-image-data-of-test-pattern. Therefore, the controller 100 can acquire accurate corrected captured-image-data.

Returning to the explanation of the flowchart illustrated in FIG. 12, when executing smoothing on the captured-image-data-of-unprinted-area, the controller 100 acquires corrected captured-image-data by executing shading correction based on the captured-image-data-of-unprinted-area representing the smoothed captured image G7 and the captured-image-data-of-test-pattern representing the non-smoothed captured image data G5 (step SB6).

FIG. 14A is a diagram illustrating an example of a captured image G8 represented by the corrected captured-image-data. In particular, FIG. 14A illustrates the captured image G8 represented by the corrected captured-image-data, which is acquired based on the captured-image-data-of-unprinted-area representing the smoothed captured image G7 and the captured-image-data-of-test-pattern representing the non-smoothed captured image data G5.

As illustrated in FIG. 14A, the captured image G8 is a rectangular-shaped captured image, a length of the captured image G8 in the perpendicular direction TY1 (a direction corresponding to a movement direction of the carriage 6) has a dimension Lx, and a length of the captured image G8 in the transport direction HY1 (a direction corresponding to the direction in which the print medium 3 is transported by the transport mechanism 106) has a dimension Ly. As illustrated in FIG. 14A, the captured image G8 includes two first test patterns TP1 and two second test patterns TP2.

When comparing the captured image G8 illustrated in FIG. 14A and the captured image G5 illustrated in FIG. 10A, brightness unevenness is included in the captured image G5 illustrated in FIG. 10A, whereas brightness unevenness is reduced in the captured image G8 illustrated in FIG. 14A. This is because brightness unevenness is reduced by performing shading correction when acquiring the corrected captured-image-data.

Figure 14B:
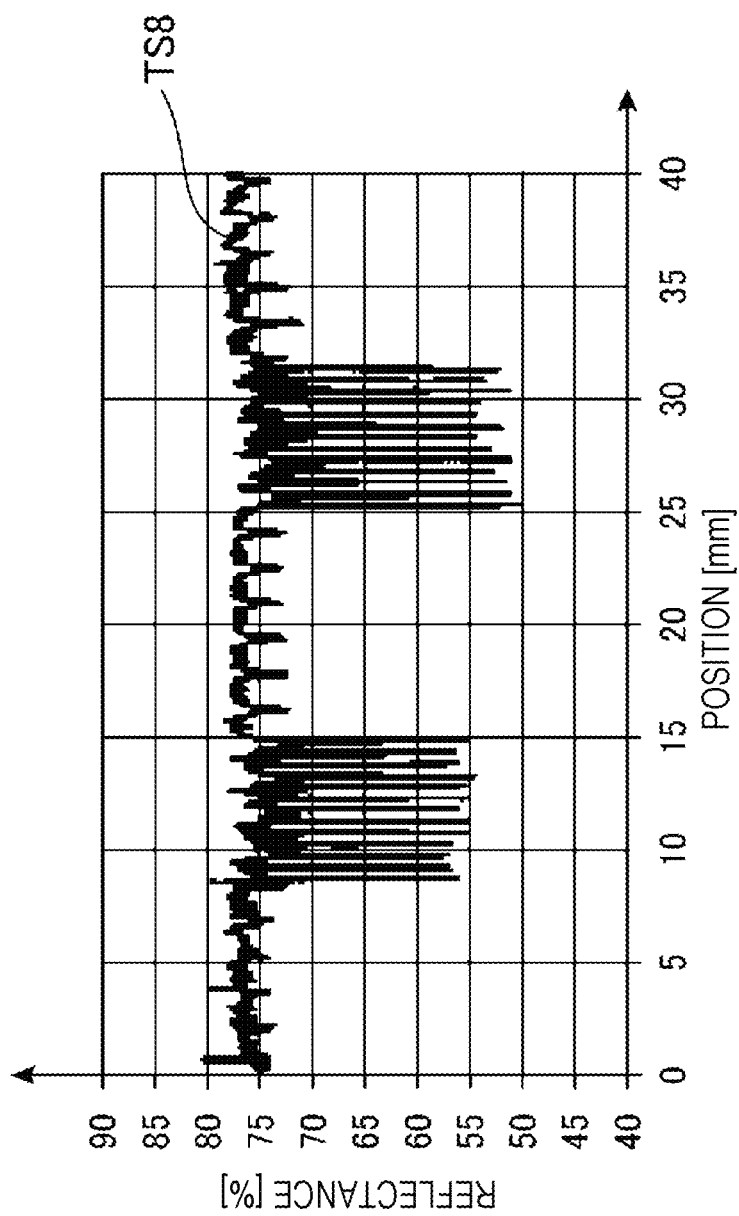
FIG. 14B is a graph illustrating an example of a characteristic of gradation values of a first test pattern.

FIG. 14B is a graph illustrating an example of a characteristic TS8 of gradation values of the first test pattern TP1 of the captured image G8.

The characteristic TS8 illustrated in FIG. 14B is a characteristic of gradation values of pixels of the captured image G8 with respect to a position of an area A3 of the captured image G8 illustrated in FIG. 14A in the perpendicular direction TY1. The area A3 illustrated in FIG. 14A and the area A3 illustrated in FIG. 13A are the same area.

In FIG. 14B, a vertical axis represents percentages of gradation values of the captured image G8 with respect to, for example, a white gradation value. That is, the vertical axis represents reflectance of irradiation light in the capturing area SA. In addition, in FIG. 14B, a horizontal axis represents a position in the perpendicular direction TY1, and a unit of the horizontal axis is millimeter (mm). In FIG. 14B, a position of a pixel of the captured image G8 that is positioned closest to the direction TY11 (a direction corresponding to the one movement direction of the carriage 6) is set as the origin of the horizontal axis.

As described above, the characteristic TS8 illustrated in FIG. 14B is a characteristic of gradation values of pixels of the area A3 of the captured image G8 illustrated in FIG. 14A. Thus, the characteristic TS8 of FIG. 14B is a characteristic of average gradation values obtained by averaging gradation values of pixels of an area of the region A3 that is elongated in the transport direction HY1 (an area in a direction in which the dimension Lya3 extends) with respect to the area A3 in the perpendicular direction TY1. As illustrated in FIG. 14B, the characteristic TS8 does not represent a U-shaped characteristic such as the TS5 illustrated in FIG. 10B. That is, FIG. 14B illustrates that the captured image G8 is a captured image in which brightness unevenness is reduced.

In addition, as illustrated in FIG. 14B, the characteristic TS8 represents that the gradation value decreases at a position corresponding to the ruled line KS of the first test pattern TP1. More specifically, as illustrated in FIG. 14A, each of the first test patterns of the captured image G8 includes 13 ruled lines KS. Thus, the characteristic TS8 represents a characteristic including 13 points at which the gradation value becomes the minimum value in a range of approximately 7 mm to approximately 15 mm, and including 13 points at which the gradation value becomes the minimum value in a range of approximately 25 mm to approximately 33 mm.

In addition, as is clear from comparison between FIG. 14B and FIG. 11B, even when the print medium 3 includes the texture TC, in the characteristic TS8 illustrated in FIG. 14B, a phenomenon in which the reflectance increases at a position corresponding to the texture TC is decreased. This is because, in Equation (1) when acquiring the corrected captured-image-data, the gradation value of each pixel of the captured-image-data-of-test-pattern is divided by the gradation value of each pixel of the smoothed captured-image-data-of-unprinted-area. Therefore, even in a case where the position of the texture TC overlaps with the position of the ruled line KS of the test pattern TP, in the corrected captured-image-data, a phenomenon in which the gradation value of the pixel corresponding to the position of the ruled line KS increases is suppressed.

Therefore, as described above, the controller 100 acquires the corrected captured-image-data based on the smoothed captured-image-data-of-unprinted-area and the captured-image-data-of-test-pattern. Thus, even in a case where the texture TC and the ruled line KS overlap with each other, the gradation value of the pixel corresponding to the position of the ruled line KS of the corrected captured-image-data is not increased. Thus, it is possible to prevent the minimum value of the gradation value corresponding to the ruled line KS of the test pattern TP from being unrecognizable. Thereby, the controller 100 can acquire accurate corrected captured-image-data.

Returning to the explanation of the flowchart illustrated in FIG. 12, when acquiring the corrected captured-image-data, the controller 100 generates (acquires) a reflectance characteristic of light with which the first test pattern is irradiated (hereinafter, referred to as "first test pattern reflectance characteristic") and a reflectance characteristic of light with which the second test pattern is irradiated (hereinafter, referred to as "second test pattern reflectance characteristic") based on the corrected captured-image-data which is acquired (step SB7).

When acquiring the first test pattern reflectance characteristic and the second test pattern reflectance characteristic, the controller 100 specifies an area for generating (acquiring) the first test pattern reflectance characteristic (hereinafter, referred to as "first acquisition area") and an area for generating (acquiring) the second test pattern reflectance characteristic (hereinafter, referred to as "second acquisition area") in the captured image G8 represented by the corrected captured-image-data.

FIG. 15A is a diagram for explaining a first acquisition area PA1 and a second acquisition area PA2.

A captured image G9 illustrated in FIG. 15A is a captured image including one test pattern TP1 and one test pattern TP2 in the captured image G8 of FIG. 14A that is represented by the corrected captured-image-data. The captured image G9 may be a captured image cut out from the captured image G8 or may be a captured image enlarged from the captured image G8.

First, specifying of the first acquisition area PA1 will be described.

The controller 100 specifies a reference line TKJ1, a reference line TKJ2, a reference line HKJ1, a reference line HKJ2, a reference line HKJ3, and a reference line HKJ4, which are printed together with the first test pattern TP1 and the second test pattern TP2, in the captured image G9. The reference line TKJ1 is printed so as to be closer to the direction TY11 (a direction corresponding to the other movement direction of the carriage 6) than the first test pattern TP1 is and to extend along the transport direction HY1 (a direction corresponding to the direction in which the print medium 3 is transported by the transport mechanism 106). The reference line TKJ2 is printed so as to be closer to the direction TY12 (a direction corresponding to the one movement direction of the carriage 6) than the first test pattern TP1 is and to extend along the transport direction HY1. That is, the reference line TKJ1 and the reference line TKJ2 are printed so as to interpose the first test pattern in the perpendicular direction TY1. The reference line HKJ1 is printed so as to be closer to the direction TY11 than the first test pattern TP1 is, to be on the downstream side in the transport direction HY1 than the reference line HKJ3 is, and to be perpendicular to the reference line TKJ1. The reference line HKJ2 is printed so as to be closer to the direction TY12 than the first test pattern TP1 is, to be on the downstream side in the transport direction HY1 than the reference line HKJ4 is, and to be perpendicular to the reference line TKJ2. The reference line HKJ3 is printed so as to be closer to the direction TY11 than the first test pattern TP1 is, to be on the upstream side in the transport direction HY1 than the reference line HKJ1 is, and to extend along the perpendicular direction TY1. The reference line HKJ4 is printed so as to be closer to the direction TY12 than the first test pattern TP1 is, to be on the upstream side in the transport direction HY1 than the reference line HKJ2 is, and to extend along the perpendicular direction TY1.

First, the controller 100 specifies a length of the first acquisition area PA1 in the perpendicular direction TY1 (a direction corresponding to the movement direction of the carriage 6) based on the reference line TKJ1 and the reference line TKJ2. For example, the controller 100 specifies a length from the reference line TKJ1 to the reference line TKJ2, as the length of the first acquisition area PA1 in the perpendicular direction TY1.

Next, the controller 100 specifies a length of the first acquisition area PA1 in the transport direction HY1 based on the reference line HKJ1 and the reference line HKJ3, or the reference line HKJ2 and the reference line HKJ4. For example, the controller 100 specifies a length from a position away from the reference line HKJ1 by a distance MA1 toward the upstream side in the transport direction HY1 to a position away from the reference line HKJ3 by a distance MA2 toward the downstream side in the transport direction HY1, as a length of the first acquisition area PA1 in the transport direction HY1.

The controller 100 specifies a rectangular area formed by the specified length of the first acquisition area PA1 in the perpendicular direction TY1 and the specified length of the first acquisition area PA1 in the transport direction HY1, as the first acquisition area PA1.

Next, specifying of the second acquisition area PA2 will be described.

The controller 100 specifies a reference line TKJ3, a reference line TKJ4, a reference line HKJ3, a reference line HKJ4, a reference line HKJ5, and a reference line HKJ6, which are printed together with the first test pattern TP1 and the second test pattern TP2, in the captured image G9. The reference line TKJ3 is printed so as to be closer to the direction TY11 than the second test pattern TP2 is and to extend along the transport direction HY1. The reference line TKJ4 is printed so as to be closer to the direction TY12 than the second test pattern TP2 is and to extend along the transport direction HY1. That is, the reference line TKJ3 and the reference line TKJ4 are printed so as to interpose the second test pattern TP2 in the perpendicular direction TY1. The reference line HKJ5 is printed so as to be closer to the direction TY11 than the second test pattern TP2 is, to be on the upstream side in the transport direction HY1 than the reference line HKJ3 is, and to be perpendicular to the reference line TKJ3. The reference line HKJ6 is printed so as to be closer to the direction TY12 than the second test pattern TP2 is, to be on the downstream side in the transport direction HY1 than the reference line HKJ4 is, and to be perpendicular to the reference line TKJ4.

First, similar to the specifying of the first acquisition area PA1, the controller 100 specifies a length of the second acquisition area PA2 in the perpendicular direction TY1 based on the reference line TKJ3 and the reference line TKJ4. Next, similar to the specifying of the first acquisition area PA1, the controller 100 specifies a length of the second acquisition area PA2 in the transport direction HY1 based on the reference line HKJ3 and the reference line HKJ5, or the reference line HKJ4 and the reference line HKJ6. The controller 100 specifies a rectangular area formed by the specified length of the second acquisition area PA2 in the perpendicular direction TY1 and the specified length of the second acquisition area PA2 in the transport direction HY1, as the second acquisition area PA2.

In this manner, when specifying the first acquisition area PA1, the controller 100 acquires a characteristic representing a tendency of average gradation values obtained by averaging gradation values of pixels of the area of the first acquisition area PA1 in the transport direction HY1 with respect to the first acquisition area PA1 in the perpendicular direction TY1, as the first test pattern reflectance characteristic. In addition, when specifying the second acquisition area PA2, the controller 100 acquires a characteristic representing a tendency of average gradation values obtained by averaging gradation values of pixels of the area of the second acquisition area PA2 in the transport direction HY1 with respect to the second acquisition area PA2 in the perpendicular direction TY1, as the second test pattern reflectance characteristic.

Figure 15B:
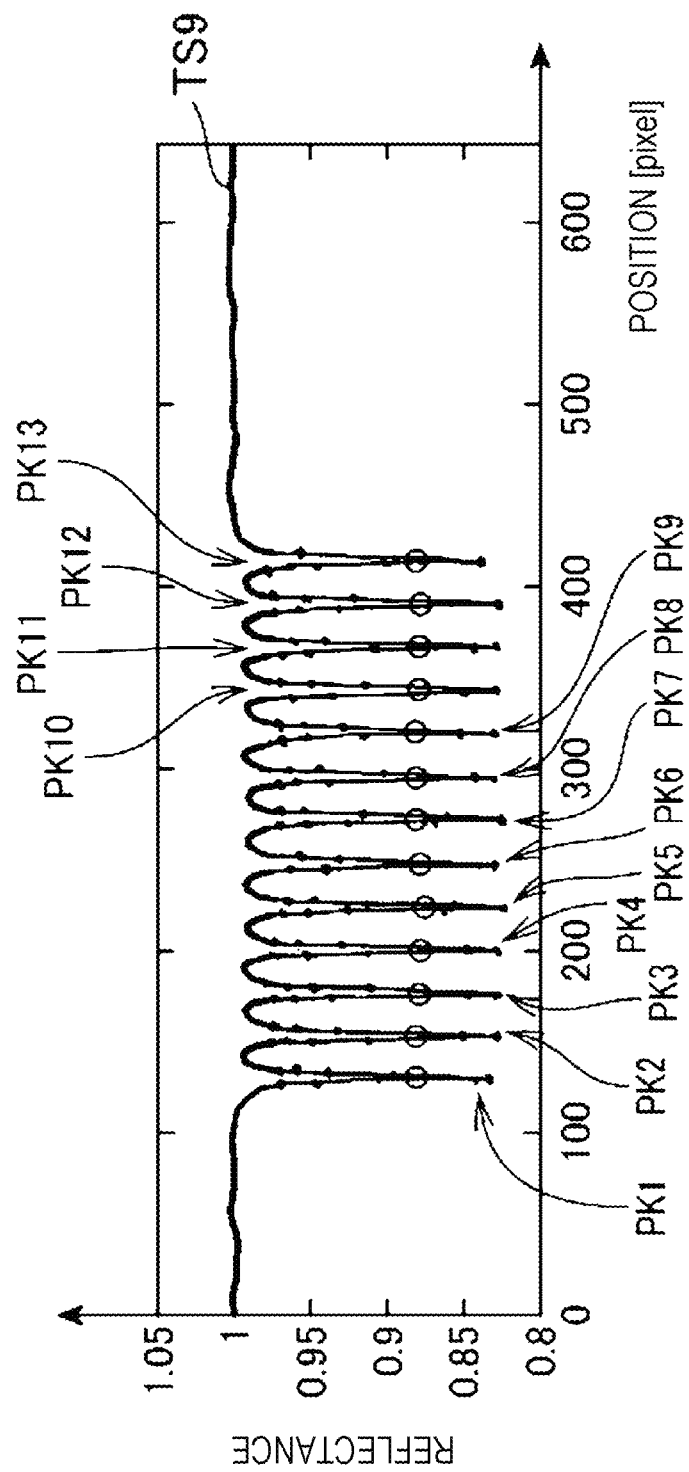
FIG. 15B is a graph illustrating an example of a first test pattern reflectance characteristic.

FIG. 15B is a graph illustrating an example of a first test pattern reflectance characteristic TS9.

FIG. 15B illustrates the first test pattern reflectance characteristic TS9 based on the first acquisition area PA1 of FIG. 15A. In FIG. 15B, a vertical axis represents a ratio of the average gradation value of the first acquisition area PA1 with respect to a certain gradation value of 1, for example, a gradation value of white. That is, the vertical axis represents reflectance of light in a case where a certain gradation value is set to 1. In addition, in FIG. 15B, a horizontal axis represents a position of the first acquisition area PA1 in the perpendicular direction TY1, and a unit of the horizontal axis is pixel. In FIG. 15B, a pixel of the first acquisition area PA1 that is positioned closest to the direction TY11 is set as the origin of the horizontal axis.

As illustrated in FIG. 15B, the first test pattern reflectance characteristic TS9 has a minimum value PK1 to a minimum value PK13 by the number of the ruled lines KS of the first test pattern TP1 in the first acquisition area PA1. Each of the minimum value PK1 to the minimum PK13 corresponds to each of the ruled lines KS of the first test pattern TP1. More specifically, each of the minimum value PK1 to the minimum value PK13 corresponds to each of the ruled lines KS of the first test pattern TP1, in order from the minimum value PK1 and in order from the ruled line KS positioned closest to the direction TY11. For example, the minimum value PK1 corresponds to the ruled line KS positioned closest to the direction TY11 among the ruled lines KS of the first test pattern.

FIG. 15C is a graph illustrating an example of a second test pattern reflectance characteristic TS10.

FIG. 15C illustrates the second test pattern reflectance characteristic TS10 based on the second acquisition area PA2 of FIG. 15A. In FIG. 15C, a vertical axis represents a ratio of the average gradation value of the second acquisition area PA2 with respect to a certain gradation value of 1, for example, a gradation value of white. That is, the vertical axis represents reflectance of light in a case where a certain gradation value is set to 1. In addition, in FIG. 15C, a horizontal axis represents a position of the second acquisition area PA2 in the perpendicular direction TY1, and a unit of the horizontal axis is pixel. In FIG. 15C, a pixel of the second acquisition area PA2 that is positioned closest to the direction TY11 is set as the origin of the horizontal axis.

As illustrated in FIG. 15C, the second test pattern reflectance characteristic TS10 has a minimum value PK14 to a minimum value PK26 by the number of the ruled lines KS of the second test pattern TP2 in the second acquisition area PA2. Each of the minimum value PK14 to the minimum PK26 corresponds to each of the ruled lines KS of the second test pattern TP2. More specifically, each of the minimum value PK14 to the minimum value PK26 corresponds to each of the ruled lines KS of the second test pattern TP2, in order from the minimum value PK14 and in order from the ruled line KS positioned closest to the direction TY11. For example, the minimum value PK14 corresponds to the ruled line KS positioned closest to the direction TY11 among the ruled lines KS of the second test pattern.

Returning to the explanation of the flowchart illustrated in FIG. 12, when acquiring the first test pattern reflectance characteristic TS9 and the second test pattern reflectance characteristic TS10, the controller 100 generates (acquires) a ruled-line shift characteristic based on the acquired first test pattern reflectance characteristic TS9 and the acquired second test pattern reflectance characteristic TS10 (step SB8). The ruled-line shift characteristic is a characteristic representing a shift between a position corresponding to the minimum value of the first test pattern reflectance characteristic TS9 and a position corresponding to the minimum value of the second test pattern reflectance characteristic TS10 with respect to a predetermined shift between the ruled line KS of the first test pattern TP1 and the ruled line KS of the second test pattern TP2. That is, the ruled-line shift characteristic represents a shift between the actually-printed ruled line KS of the first test pattern TP1 and the actually-printed ruled line KS of the second test pattern with respect to a predetermined shift between the ruled line KS of the first test pattern and the ruled line KS of the second test pattern.

When acquiring the ruled-line shift characteristic, for example, the controller 100 executes plotting of a difference between a position of the minimum value PK1 and a position of the minimum value PK14 with respect to a predetermined shift between the ruled line KS corresponding to the minimum value PK1 and the ruled line KS corresponding to the minimum value PK14, by referring to values of the characteristic TS9 of FIG. 15B on the horizontal axis and values of the characteristic TS10 of FIG. 15C on the horizontal axis. The difference is a shift between the actually-printed ruled line KS of the first test pattern TP1 and the actually-printed ruled line KS of the second test pattern TP2. The controller 100 executes plotting based on the minimum value PK2 and the minimum value PK15 in the same manner, and thereafter executes plotting based on the corresponding minimum values in the same manner. The controller 100 calculates an approximate curve based on plots obtained by the plotting according to a predetermined algorithm, and acquires the calculated approximate curve as a ruled-line shift characteristic.

Figure 16:
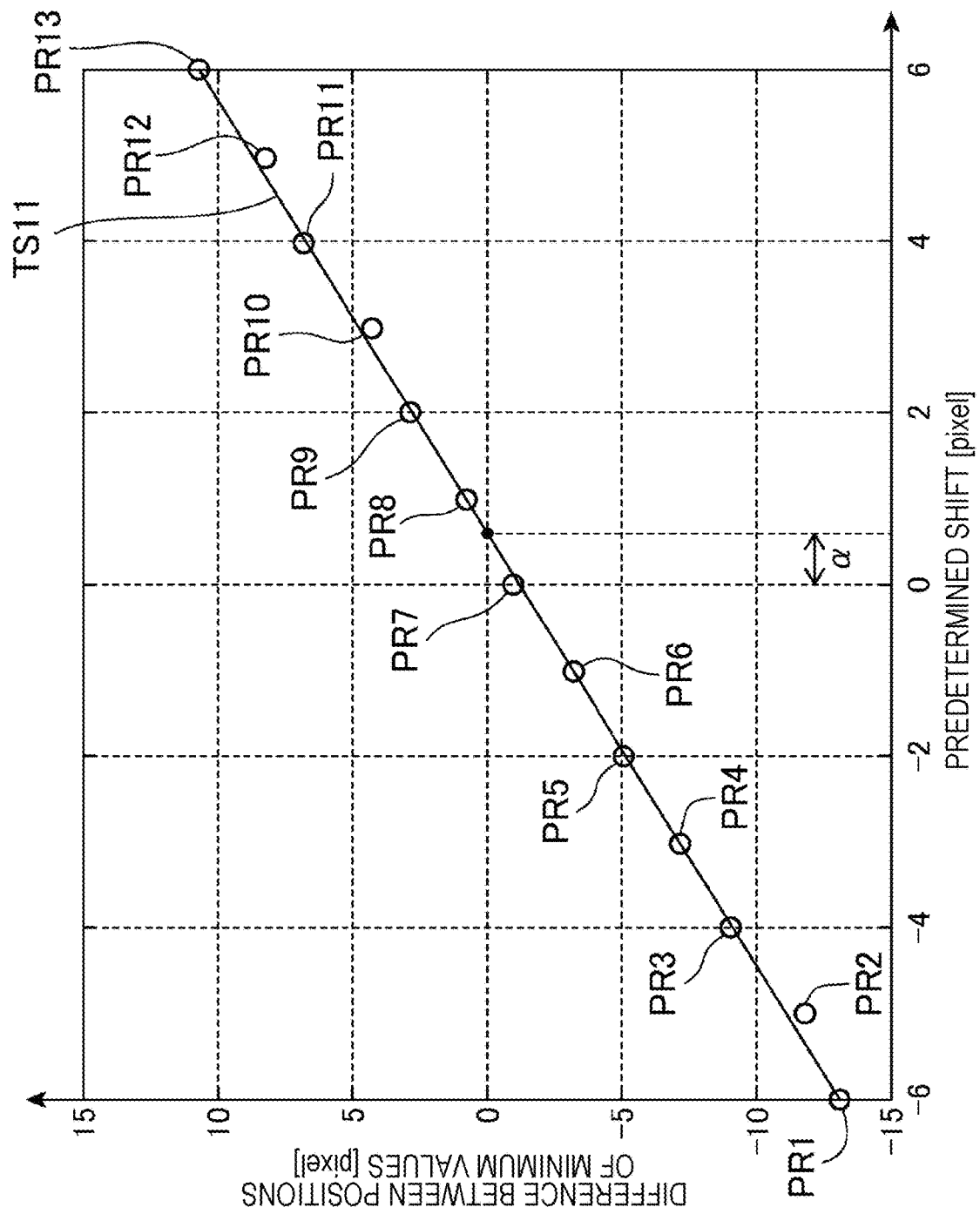
FIG. 16 is a graph illustrating an example of a ruled-line shift characteristic.

FIG. 16 is a graph illustrating an example of a ruled-line shift characteristic TS11.

In FIG. 16, a vertical axis represents a difference between the position of the minimum value of the first test pattern reflectance characteristic TS9 and the position of the minimum value of the second test pattern reflectance characteristic TS10, and a unit of the vertical axis is pixel. In addition, a horizontal axis represents a predetermined shift between the ruled line KS of the first test pattern and the ruled line KS of the second test pattern, and a unit of the horizontal axis is pixel.

As illustrated in FIG. 16, a plot PR1 represents "−6" in the horizontal axis. That is, a predetermined shift between the ruled line KS positioned closest to the direction TY11 among the ruled lines KS of the first test pattern TP1 and the ruled line KS positioned closest to the direction TY11 among the ruled lines KS of the second test pattern is "−6 pixel".

In addition, as illustrated in FIG. 16, a plot PR2 represents "−5" in the horizontal axis. That is, a predetermined shift between the second ruled line KS from the direction TY11 among the ruled lines KS of the first test pattern and the second ruled line KS from the direction TY11 among the ruled lines KS of the second test pattern is "−5 pixel".

Similarly, in FIG. 16, a plot PR3 represents that a predetermined shift between the third ruled line KS from the direction TY11 among the ruled lines KS of the first test pattern and the third ruled line KS from the direction TY11 among the ruled lines KS of the second test pattern is "−4 pixel".

Similarly, in FIG. 16, a plot PR4 represents that a predetermined shift between the fourth ruled line KS from the direction TY11 among the ruled lines KS of the first test pattern and the fourth ruled line KS from the direction TY11 among the ruled lines KS of the second test pattern is "−3 pixel".

Similarly, in FIG. 16, a plot PR5 represents that a predetermined shift between the fifth ruled line KS from the direction TY11 among the ruled lines KS of the first test pattern and the fifth ruled line KS from the direction TY11 among the ruled lines KS of the second test pattern is "−2 pixel".

Similarly, in FIG. 16, a plot PR6 represents that a predetermined shift between the sixth ruled line KS from the direction TY11 among the ruled lines KS of the first test pattern and the sixth ruled line KS from the direction TY11 among the ruled lines KS of the second test pattern is "−1 pixel".

Similarly, in FIG. 16, a plot PR7 represents that a predetermined shift between the seventh ruled line KS from the direction TY11 among the ruled lines KS of the first test pattern and the seventh ruled line KS from the direction TY11 among the ruled lines KS of the second test pattern is "0 pixel".

The same is true for a plot PR8 to a plot PR13.

A shift between the seventh ruled line KS of the first test pattern TP1 from the direction TY11 and the seventh ruled line KS of the second test pattern from the direction TY11 is set to "0 pixel" in advance. Therefore, originally, a shift between the position of the minimum value PK7 of the first test pattern reflectance characteristic TS9 corresponding to the ruled line KS of the first test pattern and the position of the minimum value PK20 of the second test pattern reflectance characteristic TS10 corresponding to the ruled line KS of the second test pattern is "0". On the other hand, as illustrated in FIG. 16, the plot PR7 has a value lower than "0" on the vertical axis. As described above, the first test pattern TP1 is printed when the carriage 6 moves in the direction TY12, and the second test pattern TP2 is printed when the carriage 6 moves in the direction TY11. That is, in FIG. 16, a shift between a landing position of the ink ejected when the carriage 6 moves in the direction TY12 and a landing position of the ink ejected when the carriage 6 moves in the direction TY11 occurs.

Returning to the explanation of the flowchart of FIG. 12, when generating (acquiring) the ruled-line shift characteristic TS11, the controller 100 calculates a shift amount for minimizing the shift between the seventh ruled line KS of the first test pattern TP1 from the direction TY11 and the seventh ruled line KS of the second test pattern TP2 from the direction TY 11, based on the acquired ruled-line shift characteristic TS11 (step SB9). That is, the controller 100 calculates a shift amount for making the shift between the seventh ruled line KS of the first test pattern TP1 from the direction TY11 and the seventh ruled line KS of the second test pattern TP2 from the direction TY 11 become "0", based on the ruled-line shift characteristic TS11 illustrated in FIG.

16. In a case of the ruled-line shift characteristic TS11 illustrated in FIG. 16, the controller 100 calculates "a pixel" which is a value on the horizontal axis at which a value of the ruled-line shift characteristic TS11 on the vertical axis becomes "0", as a shift amount.

The controller 100 stores the calculated shift amount in the storage 101, as a correction amount for the ejection timing adjustment (step SB10). For example, the controller 100 makes an ink ejection timing when the carriage 6 moves in the direction TY11 earlier than the original by the shift amount (a pixels). Thus, it is possible to prevent a shift between a landing position of the ink ejected when the carriage 6 moves in the direction TY12 and a landing position of the ink ejected when the carriage 6 moves in the direction TY11 from occurring.

As described above, the controller 100 can acquire accurate corrected captured-image-data. Thus, even in a case where the test pattern TP is printed on the print medium 3 including the texture TC, it is possible to accurately calculate the shift amount. Therefore, the controller 100 can execute the ejection timing adjustment with high accuracy. In particular, the test pattern TP includes the first test pattern TP1 printed when the carriage 6 moves in the direction TY12 and the second test pattern TP2 printed when the carriage 6 moves in the direction TY11. Therefore, the controller 100 calculates the shift amount based on the first test pattern reflectance characteristic TS9 and the second test pattern reflectance characteristic TS10. Thereby, the controller 100 can calculate a shift between a landing position of the ink ejected when the carriage 6 moves in the direction TY12 and a landing position of the ink ejected when the carriage 6 moves in the direction TY11 with high accuracy.

As described above, the printing apparatus 1 includes an ink jet head 8 (print head) that executes printing on the print medium 3, a camera 72 that captures an image on the print medium 3, an LED light source 73*a* (light source) and an LED light source 73*b* (light source) that irradiate a capturing area SA of the camera 72 with light at a predetermined angle with respect to a print surface 3*a* of the print medium 3, and a carriage 6 including the ink jet head 8, the camera 72, and the LED light source 73*a* and the LED light source 73*b*. In addition, the printing apparatus 1 includes a controller 100. The controller 100 executes calculation based on captured-image-data-of-unprinted-area (first captured image data) representing a captured image of an unprinted area that is obtained by capturing an image on the print medium 3 by the camera 72 and captured-image-data-of-test-pattern (second captured image data) representing a captured image of a test pattern TP that is obtained by capturing an image of the test pattern TP by the camera 72, the test pattern TP being printed on the print medium 3 by the ink jet head 8. The controller 100 generates (acquires) corrected captured-image-data (third captured image data) representing a captured image of the test pattern TP, the corrected captured-image-data in which brightness unevenness (an influence of light irradiation) by the LED light source 73*a* and the LED light source 73*b* is adjusted.

In this configuration, the controller 100 acquires the corrected captured-image-data of the test pattern TP based on the captured-image-data-of-unprinted-area and the captured-image-data-of-test-pattern, the corrected captured-image-data in which brightness unevenness is adjusted. Thus, even in a case where brightness unevenness is likely to occur, it is possible to acquire accurate captured image data of the test pattern TP, that is, accurate corrected captured-image-data.

In addition, the print medium 3 includes a texture TC. The controller 100 acquires the corrected captured-image-data by executing predetermined filter processing on the captured-image-data-of-unprinted-area.

In this configuration, the controller 100 acquires the corrected captured-image-data by executing predetermined filter processing on the captured-image-data-of-unprinted-area. Thus, an influence by the texture TC on the corrected captured-image-data can be decreased. Therefore, even in a case where the print medium 3 includes the texture TC, it is possible to generate (acquire) accurate captured image data of the test pattern TP.

In addition, the controller 100 acquires the corrected captured-image-data without executing predetermined filter processing on the captured-image-data-of-test-pattern.

In this configuration, the controller 100 acquires the corrected captured-image-data without executing predetermined filter processing on the captured-image-data-of-test-pattern. Therefore, filter processing is not performed on the test pattern TP, and thus the controller 100 can acquire accurate captured image data of the test pattern TP.

In addition, in the present embodiment, the predetermined filter processing is moving average filter processing or Gaussian filter processing.

The predetermined filter processing is moving average filter processing or Gaussian filter processing, and thus the controller 100 can acquire captured-image-data-of-unprinted-area in which the texture TC of the print medium 3 is smoothed. Therefore, the controller 100 can acquire accurate captured image data of the test pattern TP by executing shading correction using the smoothed captured-image-data-of-unprinted-area.

In addition, in the present embodiment, the ink jet head 8 includes a nozzle 81 for ejecting an ink. In addition, the test pattern TP includes a first test pattern TP1 including ruled lines KS which are formed at predetermined intervals and a second test pattern TP2 formed by shifting the intervals of the ruled lines KS of the first test pattern TP1 by a predetermined amount. The controller 100 executes calculation based on a first test pattern reflectance characteristic TS9 represented by the corrected captured-image-data of the first test pattern TP1 and a second test pattern reflectance characteristic TS10 represented by the corrected captured-image-data of the second test pattern TP2, calculates a shift amount for minimizing a shift between the ruled line KS of the first test pattern TP1 and the ruled line KS of the second test pattern TP2, and adjusts a timing at which the ink is ejected from the nozzle 81 by using the shift amount as a correction amount.

In this configuration, the controller 100 can calculate the shift amount with high accuracy based on the first test pattern reflectance characteristic TS9 and the second test pattern reflectance characteristic TS10. Thus, it is possible to adjust a timing at which the ink is ejected from the nozzle 81 with high accuracy.

In addition, the controller 100 causes the carriage 6 to move in the direction TY12 (first direction) of the perpendicular direction TY1 (movement direction), and causes the ink jet head 8 to print the first test pattern TP1 on the print medium. In addition, the controller 100 causes the carriage 6 to move in the direction TY11 (second direction) of the perpendicular direction TY1, and causes the ink jet head 8 to print the second test pattern TP2 on the print medium.

In this configuration, the controller 100 causes the carriage 6 to move in the direction TY12 so as to print the first test pattern TP1, and causes the carriage 6 to move in the direction TY11 so as to print the second test pattern TP2.

Thus, the controller 100 can adjust an ink ejection timing when the carriage 6 moves in the perpendicular direction TY1 with high accuracy. Therefore, the controller 100 can reliably prevent occurrence of a shift between a landing position of the ink ejected when the carriage 6 moves in the direction TY12 and a landing position of the ink ejected when the carriage 6 moves in the direction TY11.

The above-described embodiments have been presented by way of example only, and can be freely modified and applied within the scope of the invention.

For example, in the above-described embodiment, as an operation sequence of the printing apparatus 1, a sequence of capturing an image of an unprinted area by the camera 72, printing a test pattern TP, capturing an image of the test pattern TP by the camera 72, and smoothing captured-image-data-of-unprinted-area obtained by capturing is exemplified. On the other hand, as long as the smoothed captured-image-data-of-unprinted-area and the captured-image-data-of-test-pattern can be generated (acquired) in the processing of step SB6, an operation sequence of the printing apparatus is not limited the sequence.

In addition, for example, in the above-described embodiment, a case where the test pattern TP including the ruled lines KS is captured and the ejection timing adjustment including calculation of the shift amount is executed is exemplified. On the other hand, the processing which is executed based on the captured image data obtained by capturing an image on the print medium 3 is not limited to ejection timing adjustment, may be transport amount adjustment for adjusting a transport amount of the print medium 3, or may be banding correction for adjusting density unevenness. In this case, the controller 100 causes the printer to print a pattern image according to processing on the print medium 3, and acquires captured image data of the pattern image from the camera 72.

In addition, for example, in a case where a control method of the printing apparatus 1 is realized by using a computer included in the printing apparatus 1, the invention may be configured in a form of a program to be executed by a computer to realize the control method, and a computer-readable recording medium in which the program is recorded to be readable by the computer or a transmission medium for transmitting the program. As the recording medium, a magnetic recording medium, an optical recording medium, or a semiconductor memory device may be used. More specifically, a flexible disk, a hard disk drive (HDD), a compact disk read only memory (CD-ROM), a digital versatile disk (DVD), a Blu-ray (registered trademark) disc, a magneto-optical disk, a flash memory, a portable type recording medium such as a card type recording medium, or a fixed type recording medium may be used. In addition, the recording medium may be a non-volatile memory device such as a read only memory (ROM) or an HDD which is an internal memory device of the printing apparatus 1.

In addition, for easy understanding of the invention, functional blocks described with reference to FIG. 4 are schematically illustrated by classifying a functional configuration of each device according to main processing contents. The configuration of each device may be classified into more components according to the processing contents. In addition, the configuration of each device may be classified such that one component performs more processing. In addition, processing in each component may be executed by one piece of hardware, or may be executed by a plurality of pieces of hardware. In addition, processing in each component may be realized by one program, or may be realized by a plurality of programs.

In the flowchart illustrated in FIG. 12, for easy understanding of the processing in the printing apparatus 1, processing units are divided according to the main processing contents. The invention is not limited by a division manner and a division name of the processing units. The processing of the printing apparatus 1 may be divided into more processing units according to the processing contents. The processing of the printing apparatus 1 may be divided such that one processing unit includes more processing. In addition, as long as the same processing can be performed, an order of processing in the flowchart is not limited to the example illustrated in the drawings.

What is claimed is:

1. A printing apparatus comprising:
a print head configured to print on a print medium;
a camera configured to capture an image on the print medium;
a light source configured to irradiate a capturing area of the camera with light at a predetermined angle with respect to a print surface of the print medium;
a carriage configured to mount the print head, the camera, and the light source; and
a processor configured to generate third captured image data which represents a captured image of a test pattern and in which brightness unevenness is adjusted, based on first captured image data and second captured image data, the first captured image being obtained by capturing an image of an unprinted area of the print medium by the camera, and the second captured image data being obtained by printing the test pattern on the print medium by the print head and capturing an image of the printed test pattern by the camera.

2. The printing apparatus according to claim 1,
wherein the print medium includes a texture, and
wherein the processor configured to execute predetermined filter processing on the first captured image data and generate the third captured image data.

3. The printing apparatus according to claim 2,
wherein the processor configured to generate the third captured image data without executing the predetermined filter processing on the second captured image data.

4. The printing apparatus according to claim 2,
wherein the predetermined filter processing is moving average filter processing or Gaussian filter processing.

5. A printing apparatus comprising:
a print head configured to print on a print medium;
a camera configured to capture an image on the print medium;
a light source configured to irradiate a capturing area of the camera with light at a predetermined angle with respect to a print surface of the print medium;
a carriage configured to mount the print head, the camera, and the light source; and
a processor configured to generate third captured image data which represents a captured image of a test pattern and in which brightness unevenness is adjusted, based on first captured image data obtained by capturing the image on the print medium by the camera and second captured image data obtained by capturing an image of the test pattern by the camera, the test pattern being printed on the print medium by the print head,
wherein the test pattern includes a first test pattern including ruled lines which are formed at predetermined intervals and a second test pattern including ruled lines which are formed by shifting the intervals of the ruled lines of the first test pattern by a predetermined amount.

6. The printing apparatus according to claim 5,
   wherein the print head configured to include a nozzle for ejecting an ink, and
   wherein the processor configured to calculate a shift amount for minimizing a shift between the ruled lines of the first test pattern and the ruled lines of the second test pattern based on a reflectance characteristic represented by the third captured image data of the first test pattern and a reflectance characteristic represented by the third captured image data of the second test pattern, and adjust a timing at which the ink is ejected from the nozzle by using the shift amount as a correction amount.

7. The printing apparatus according to claim 5,
   wherein the processor configured to cause the carriage to move in a first direction of a movement direction and cause the print head to print the first test pattern, and
   wherein the processor configured to cause the carriage to move in a second direction of the movement direction that is opposite to the first direction and cause the print head to print the second test pattern.

8. A control method of a printing apparatus configured to include a carriage, the carriage mounting a print head which prints on a print medium, a camera which captures an image on the print medium, and a light source which irradiates a capturing area of the camera with light at a predetermined angle with respect to a print surface of the print medium, the method comprising:
   generating third captured image data which represents a captured image of a test pattern and in which brightness unevenness is adjusted, based on first captured image data and second captured image, the first captured image data being obtained by capturing the image of an unprinted area of the print medium by the camera, and the second captured image data being obtained by printing the test pattern on the print medium by the print head and capturing an image of the printed test pattern by the camera.

9. The control method of a printing apparatus according to claim 8,
   wherein the print medium includes a texture, and
   wherein predetermined filter processing is executed on the first captured image data and the third captured image data is generated.

10. The control method of a printing apparatus according to claim 9,
    wherein the predetermined filter processing is not executed on the second captured image data and the third captured image data is generated.

11. The control method of a printing apparatus according to claim 9,
    wherein the predetermined filter processing is moving average filter processing or Gaussian filter processing.

12. A control method of a printing apparatus configured to include a carriage, the carriage mounting a print head which prints on a print medium, a camera which captures an image on the print medium, and a light source which irradiates a capturing area of the camera with light at a predetermined angle with respect to a print surface of the print medium, the method comprising:
    generating third captured image data which represents a captured image of a test pattern and in which brightness unevenness is adjusted, based on first captured image data obtained by capturing the image on the print medium by the camera and second captured image data obtained by capturing an image of the test pattern by the camera, the test pattern being printed on the print medium by the print head,
    wherein the test pattern includes a first test pattern including ruled lines which are formed at predetermined intervals and a second test pattern including ruled lines which are formed by shifting the intervals of the ruled lines of the first test pattern by a predetermined amount.

13. The control method of a printing apparatus according to claim 12, the print head of the printing apparatus including a nozzle for ejecting an ink, the method further comprising:
    calculating a shift amount for minimizing a shift between the ruled lines of the first test pattern and the ruled lines of the second test pattern based on a reflectance characteristic represented by the third captured image data of the first test pattern and a reflectance characteristic represented by the third captured image data of the second test pattern; and
    adjusting a timing at which the ink is ejected from the nozzle by using the shift amount as a correction amount.

14. The control method of a printing apparatus according to claim 12, the method further comprising:
    causing the carriage to move in a first direction of a movement direction and causing the print head to print the first test pattern; and
    causing the carriage to move in a second direction of the movement direction that is opposite to the first direction and causing the print head to print the second test pattern.

* * * * *